United States Patent [19]

Maruyama et al.

[11] Patent Number: 4,918,559
[45] Date of Patent: Apr. 17, 1990

[54] SHUTTER ASSEMBLY FOR A DISK CARTRIDGE

[75] Inventors: Hiroshi Maruyama, Toride; Yoshitake Kato; Minoru Fujita, both of Ibaragi, all of Japan

[73] Assignee: Hitachi Maxwell, Ltd., Osaka, Japan

[21] Appl. No.: 387,434

[22] Filed: Jul. 31, 1989

Related U.S. Application Data

[63] Continuation of Ser. No. 865,119, May 20, 1986, abandoned.

[30] Foreign Application Priority Data

May 20, 1985 [JP] Japan .................. 60-107272
Aug. 30, 1985 [JP] Japan .................. 60-191235
Sep. 9, 1985 [JP] Japan .................. 60-197747

[51] Int. Cl.$^4$ ........................... G11B 23/03
[52] U.S. Cl. .................. 360/133; 369/291; 206/444
[58] Field of Search ......... 360/133; 369/291; 206/444, 312

[56] References Cited

U.S. PATENT DOCUMENTS

| | | | |
|---|---|---|---|
| 4,517,617 | 5/1985 | Tsuji et al. | 360/133 |
| 4,613,044 | 9/1986 | Saito et al. | 360/133 X |
| 4,622,607 | 11/1986 | Smith | 360/133 |
| 4,626,949 | 12/1986 | Brock et al. | 360/133 |
| 4,644,435 | 2/1987 | Nemoto et al. | 360/133 |
| 4,648,001 | 3/1987 | Komatsu et al. | 360/133 |
| 4,660,118 | 4/1987 | Faber | 360/133 |
| 4,680,662 | 7/1987 | Fukushima et al. | 360/133 |
| 4,698,714 | 10/1987 | Sugawara et al. | 360/133 |
| 4,714,973 | 12/1987 | Kato et al. | 360/133 |

FOREIGN PATENT DOCUMENTS 0137965 4/1985 European Pat. Off. .
0144974 6/1985 European Pat. Off. .

*Primary Examiner*—Robert S. Tupper
*Assistant Examiner*—Andrew L. Sniezek

[57] ABSTRACT

A disc cartridge comprising a cartridge case for rotatably accommodating a disc and a shutter for opening and closing at least one head accessing opening defined on the cartridge case, wherein the shutter comprises at least one plate member for opening and closing the head accessing opening and a connecting plate connected with one end of the plate member facing to one end face of the cartridge case, a first engaging member formed on the connecting plate toward the one end surface of the cartridge case and a second engaging member formed on the one end face of the cartridge case for engagement with the first engaging member to slidably mount the shutter on the cartridge case.

5 Claims, 33 Drawing Sheets

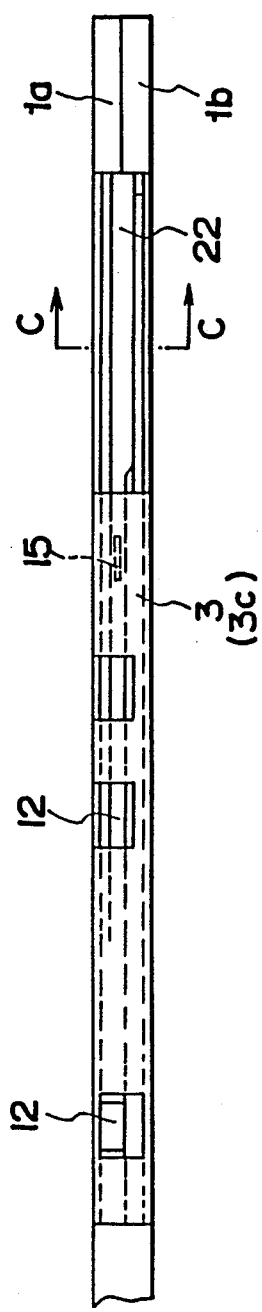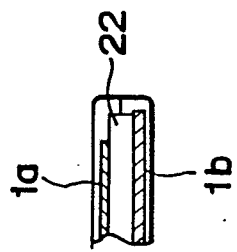

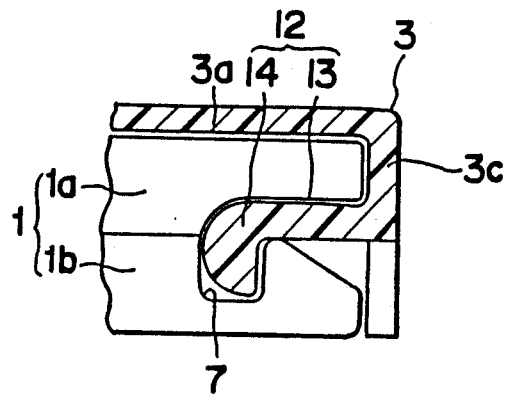
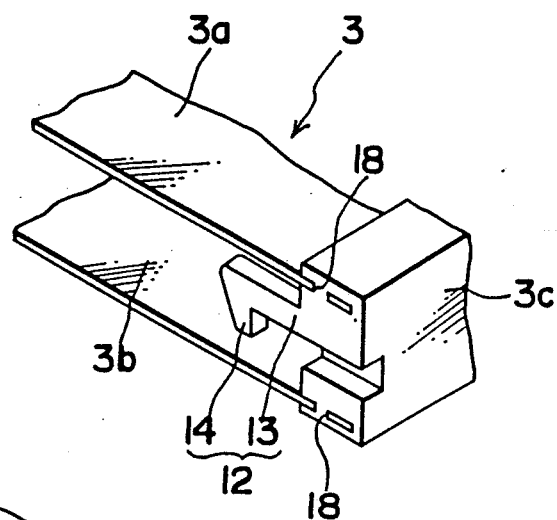
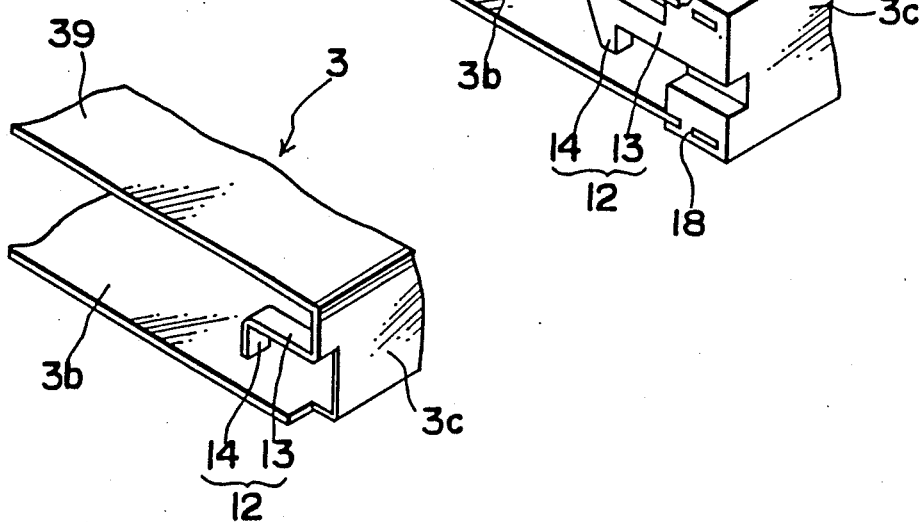

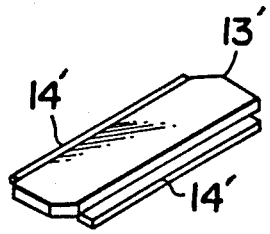
Fig. 28
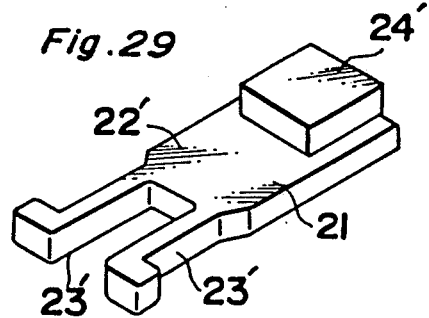
Fig. 29
Fig. 30
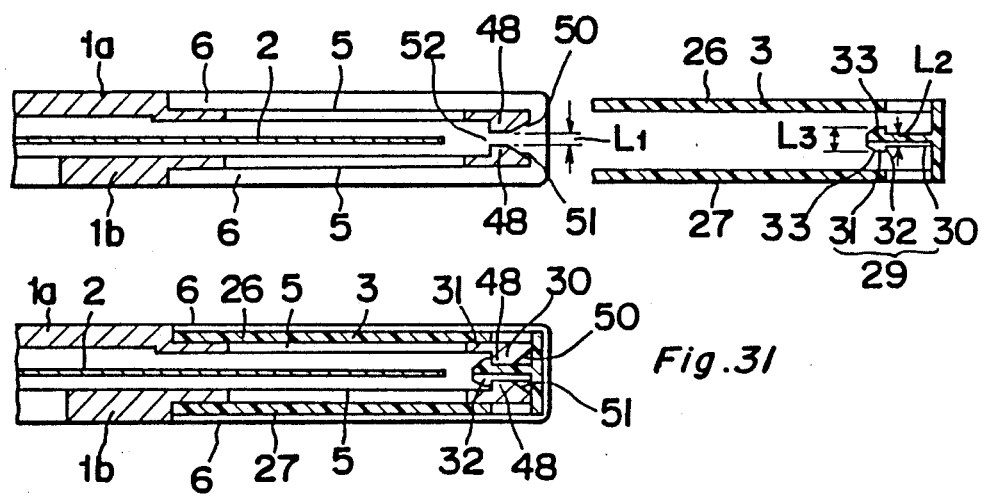
Fig. 31
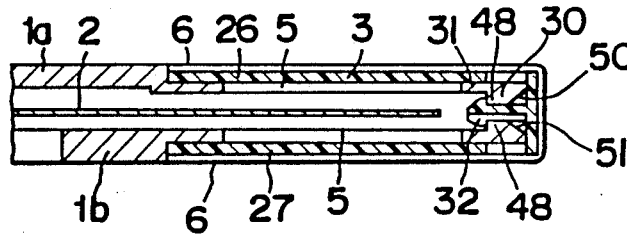

SHUTTER ASSEMBLY FOR A DISK CARTRIDGE

This application is a continuation of application Ser. No. 865,119, filed on May. 20, 1986, now abandoned.

BACKGROUND OF THE INVENTION

1. Field of the Invention

The present invention relates to a disc cartridge and more particularly to a disc cartridge having head access openings on a cartridge case and a shutter for opening and closing the head access opening. The disc cartridge according to the present invention is used for the magnetic disc cartridge, optical disc cartridge and optical and magnetic disc cartridge.

2. Description of the Prior Art

A conventional disc cartridge having a floppy magnetic disc in the thin cartridge case is shown in FIG. 1, wherein the disc cartridge comprises a thin case 51 formed by a top half 51a and bottom half 51b of a generally rectangular shape and made of hard synthetic resin materials, a magnetic disc 52 rotatably enclosed in the case 51 and a shutter 53 slidably mounted on the case 52 so as to move along one side or front side of the case 51.

In the central portion of the case 51, there are defined a circular opening 54 and a head accessing opening 55. A shallow recess 56 is defined on the top wall of the case 51 in the region near the head accessing opening 55 for sliding the shutter 53 pass the head accessing opening 55. A guide slot 57 is also defined in the top wall along the front side of the case 51 for guiding the movement of the shutter 53.

Conventionally the shutter 53 is formed of a stainless steel plate formed by a generally U shape in a side view having a pair of opposing plates 60 in each of which an opening 58 is defined with the generally same shape and size as the head accessing opening 55. A part shown by 61 adjacent to the opening 58 acts as a lid plate. Two raised members 59 are inwardly projected on one plate 60 by bending a part of the plate inwardly.

The raised members 59 are adapted to be slidably fitted in the guide slot 57 of the case 51.

In the conventional disc cartridge, the raised members 59 of the shutter 53 are projected downward from the plate member 60 forming the opening 58 and lid plate 61. In order to facilitate mounting the raised member 59 of the shutter 53 to the disc cartridge case 51, a slit is formed on the portion to which the raised member 59 engages so as to define the position of the raised member 59 when the shutter is assembled on the case 51. However, if the raised member 59 is put in an erroneous position, the raised member 59 is undesirably deformed by undue contact against the case 51. Therefore, smooth movement of the deformed raised member 59 in the guide slot 57 can not be assured. In addition, in this case, the deformed raised member 59 unduly abrades the peripheral portions of the guide slot 57 when the raised member 59 is moved, thereby producing scraped pieces which may enter and fit onto the magnetic disc 52 to have a bad effect on the magnetic characteristics of the magnetic disc 52. Moreover, in case the shutter is displaced from the redetermined position, both of the shutter plate members 60 tend to expand in directions away from each other, in particular in the case of a metal shutter, both of the shutter plate membes 60 tend to be formed in an expanding manner, so that the raised member 59 can not sufficiently fit in the guide slot 57 when the shutter 53 is assembled on the case 51, resulting in insufficient engagement of the raised member 59 with the case 51, thereby causing the shutter 53 to be easily disengaged from the case 51.

SUMMARY OF THE INVENTION

An essential object of the present invention is to provide a disc cartridge having a shutter assembly which can be easily mounted to a cartridge case and assures smooth motion of the shutter on the cartridge case.

Another object of the present invention is to provide a disc cartridge which is able to prevent undesired disengagement of a shutter from the cartridge case.

According to the present invention, there is provided a disc cartridge comprising a cartridge case for rotatably accommodating a disc and a shutter for opening and closing at least one head accessing opening defined on the cartridge case, wherein the shutter comprises at least one plate member for opening and closing the head accessing opening and a connecting plate connected with at least one end of the plate member facing to at least one end face of the cartridge case, a first engaging means formed on the connecting plate toward one end surface of the cartridge case and a second engaging means formed on the one end face of the cartridge case for engagement with the first engaging means to sliably mount the shutter on the cartridge case.

BRIEF EXPLANATION OF THE DRAWINGS

FIG. 5 is a side view of the disc cartridge shown in FIG. 3, FIG. 6 is a cross sectional view taken along the lines C—C in FIG. 3, FIG. 10 is a cross sectional view showing a second embodiment of the disc cartridge according to the present invention, FIG. 11 is a perspective view showing a third embodiment of a shutter of the disc cartridge according to the present invention, FIG. 12 is a perspective view showing a fourth embodiment of a shutter of the disc cartridge according to the present invention.

FIG. 28 is a perspective view of a pressing plate, FIG. 29 is a perspective view of a write protector, FIG. 30 is a cross sectional view showing the condition before the shutter is assembled to the case, FIG. 31 is a cross sectional view showing the condition after the shutter is assembled.

DETAILED DESCRIPTION OF THE PREFERRED EMBODIMENTS

Figure 1:
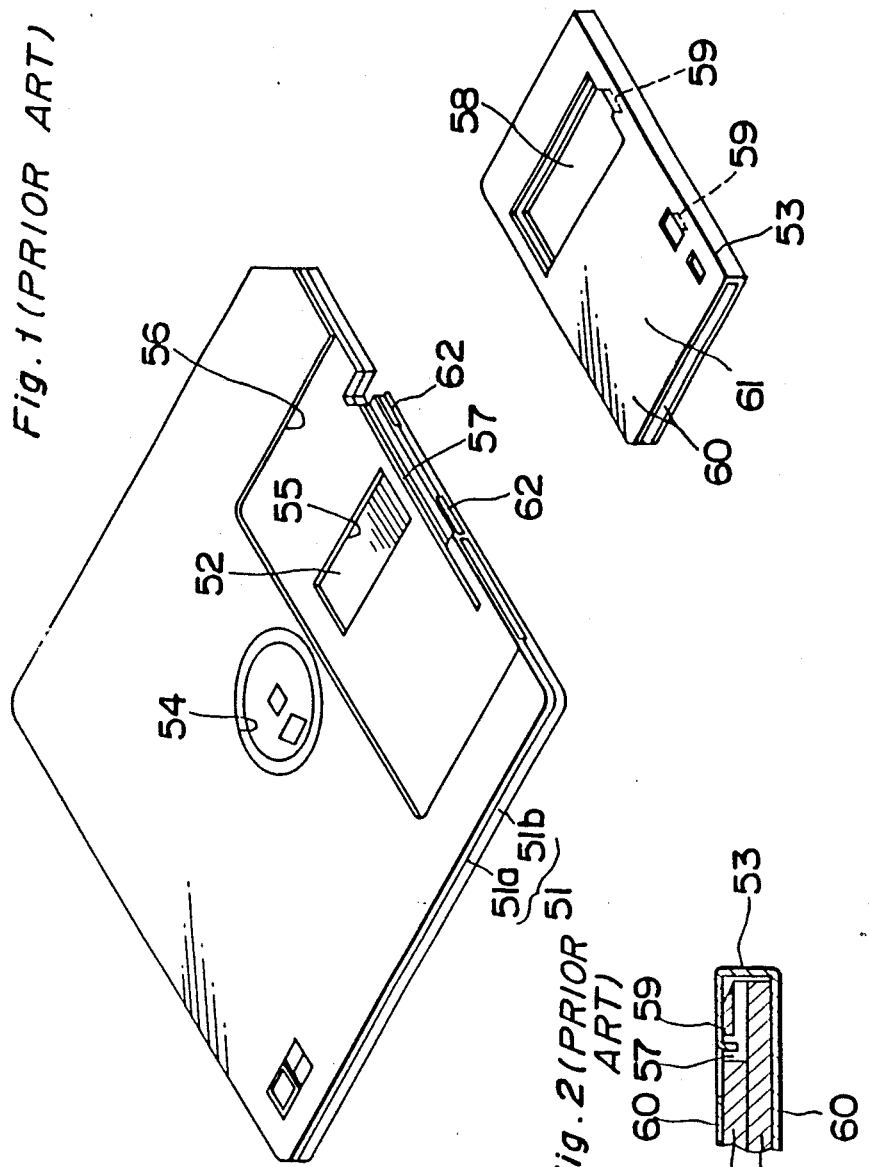
FIG. 1 is a perspective view of a conventional disc cartridge with a shutter disengaged from a cartridge case.
Figure 2:
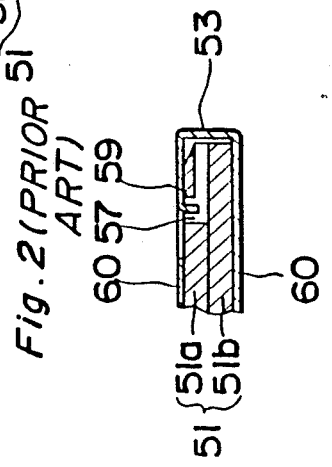
FIG. 2 is a partial cross sectional view of an essential portion of the disc cartridge shown in FIG. 1.

Referring to FIGS. 3 to 13, a disc cartridge according to the present invention is mainly comprised of a cartridge case 1, a magnetic disc 2 rotatably mounted in the cartridge case 1 and a shutter 3 slidably mounted on the cartridge case 1.

The cartridge case 1 comprises a top half case 1a and a bottom half case 1b, each being made of hard synthethic resin materials such as ABS resin and e*ach being formed by a generally flat rectangular plate surrounded by low vertical walls in the known manner.

Figure 4:
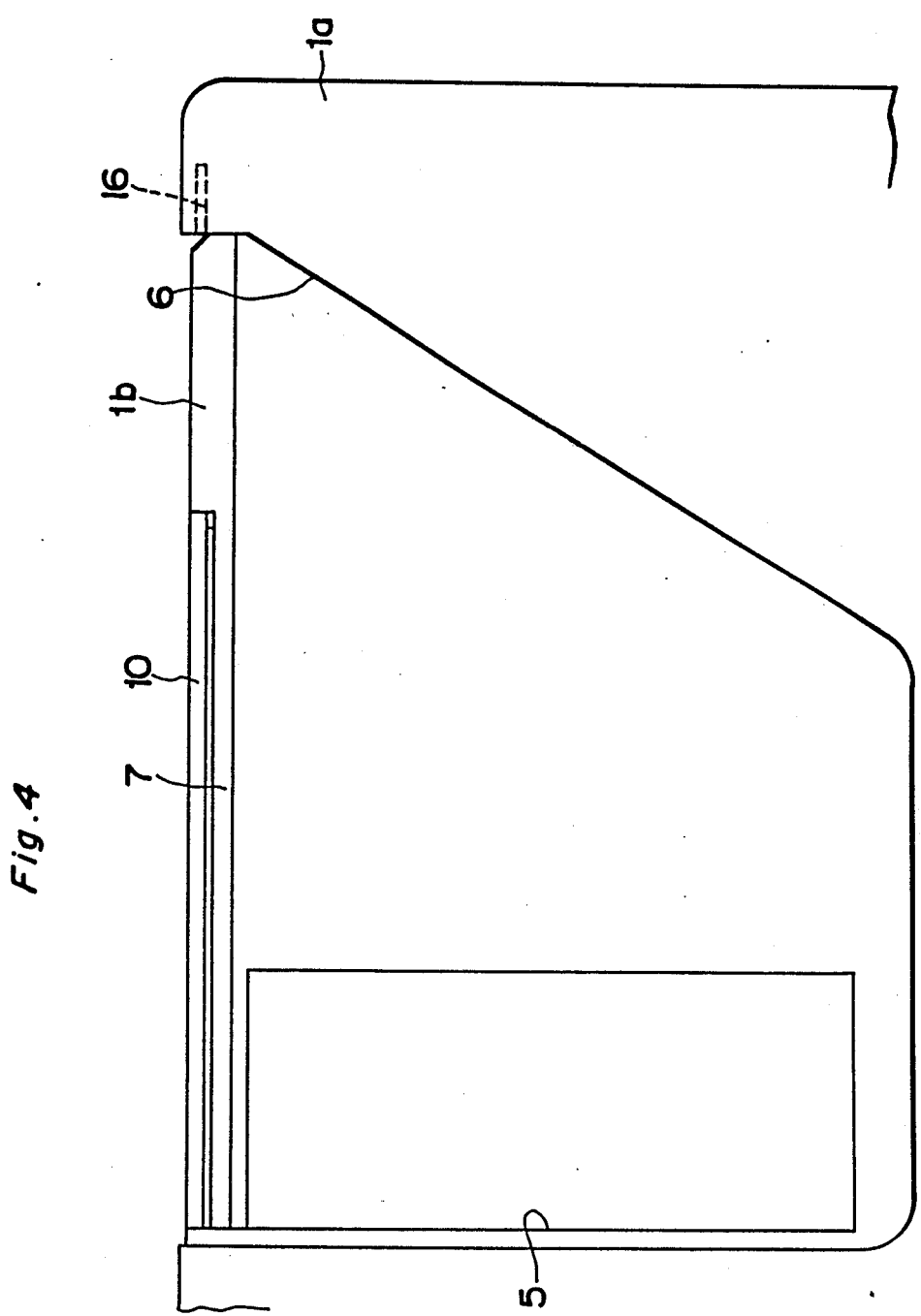
FIG. 4 is a partial top plan view of a cartridge case shown in FIg. 3.
Figure 7:
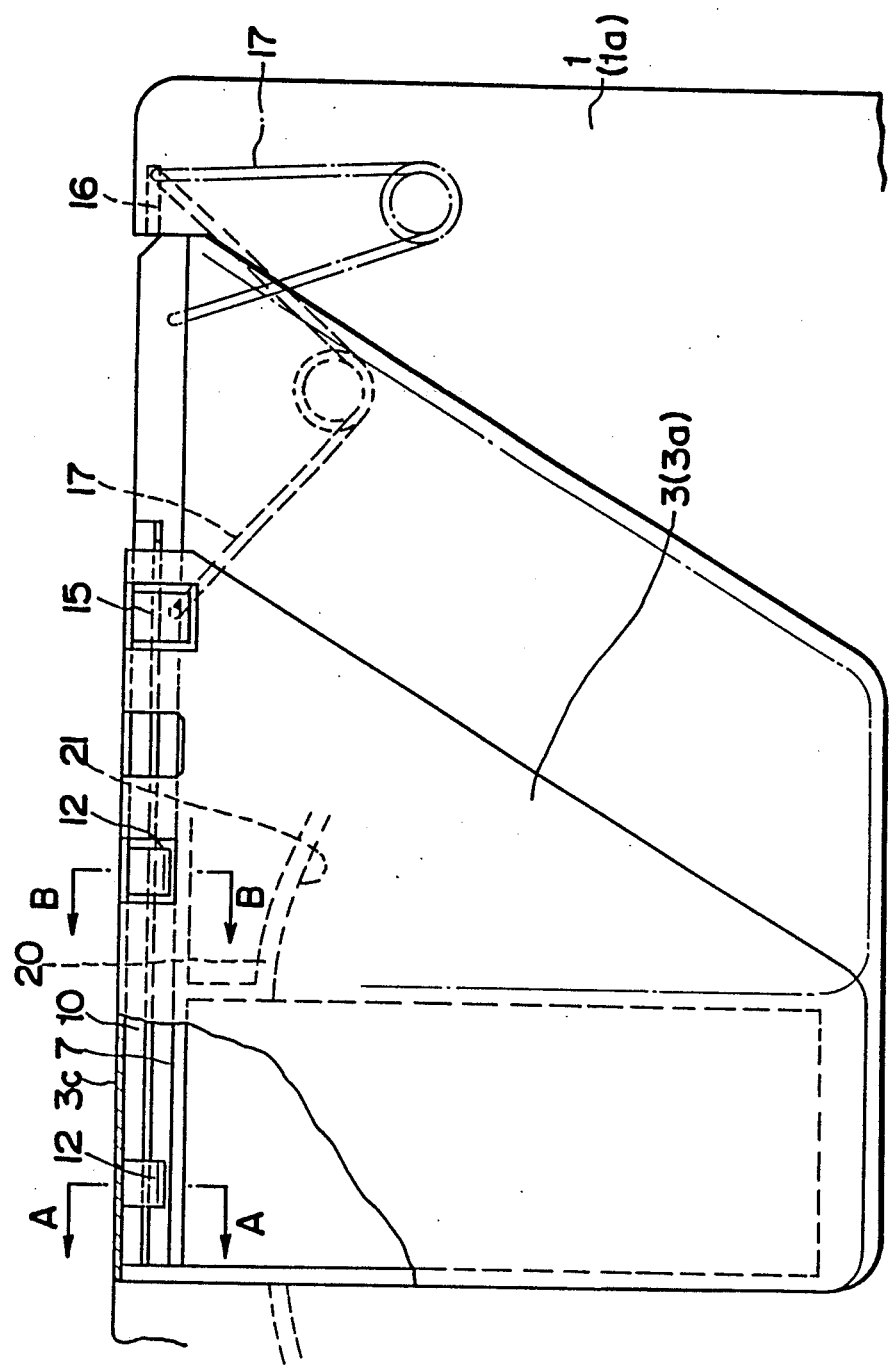
FIG. 7 is a top plan view of the disc cartridge shown in FIG. 3.
Figure 8:
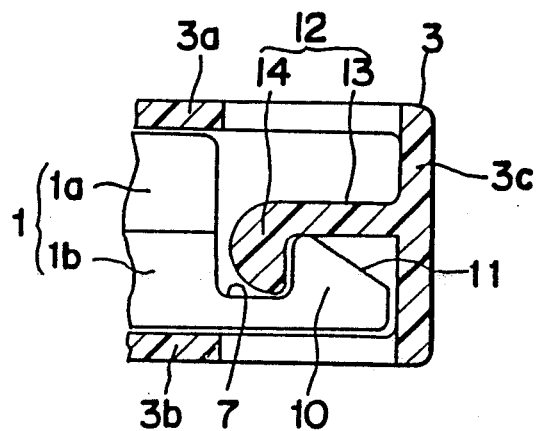
FIG. 8 is a cross sectional view taken along the lines A—A in FIG. 7.

A drive shaft insertion opening 4 is defined in the central portion of the cartridge case 1, and an elongated head accessing opening 5 is defined near the drive shaft insertion opening 4. A shallow recess 6 is defined in the front portion of each so as to limit the movement of the shutter 3. The head accessing opening 5 is defined in the recess 6. A guide slot 7 is defined on the bottom half case 1b near the front edge of the case 1, as shown in FIGS. 4 and 7, so as to extend in the direction of the movement of the shutter 3. A projection rib 10 is also formed near the front edge of the case 1, as shown in FIGS. 4 and 7, in such a manner that an inclined surface 11 is formed on the front side of the projection rib 10 so as to incline frontwardly and downwardly.

Figure 3:
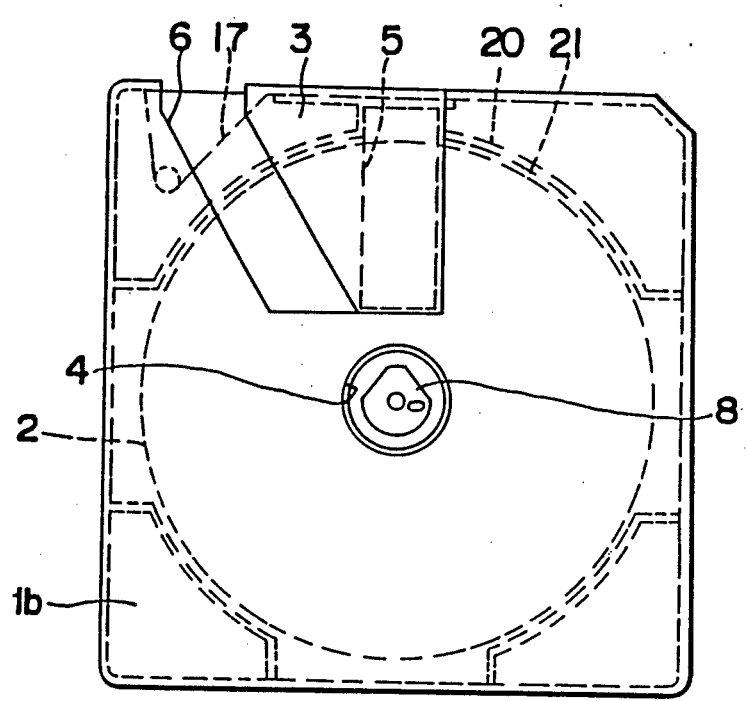
FIG. 3 is a top plan view of an example of a disc cartridge according to the present invention.

As shown in FIG. 3, ribs 20 are formed in the case 1 around the disc chamber 21 for accommodating the disc 2 so as to conform the parts of the circle of the disc 2. Each rib 20 is connected to the periphery of the case 1. By separating the disc chamber 21 from the outside, even if scraped pieces of the case are produced, the scraped pieces are prevented from entering into the disc chamber 21.

THe magnetic disc 2 is rotatably accommodated in the disc chamber 21 and is provided with a hub 8 which is rotatably accommodated in the drive shaft insertion opening 4 of the first case half 1a, as shown in FIG. 3.

The shutter 3 is made of synthetic resin materials such as polyacetal resin or polyamid resin with a predetermined resiliency deformable easier than the cartridge case 1. The shutter 3 is formed by a first flat plate 3a, second flat 3b opposing in parallel with the first plate 3a and a connecting plate 3c for connecting both plates 3a and 3b, so that the shutter 3 is formed generally in a U character shape in a side elevational view and in a trapezoid shape in plan view with a sufficient area for closing the head accessing opening 5.

Two engaging tips 12 which are deformable resiliently are projected from the connecting plate 3c toward the case 1 with a predetermined interval along the movement of the shutter 3. Each of the engaging tips 12 comprises a resilient member 13 extending perpendicular to the connecting plate 3c and a tip portion 14 formed at the free end portion of the resilient member 13. The side surface of the tip portion 14 facing to the case 1 is shaped round so as to facilitate the insertion along the inclined surface 11 of the bottom case 1.

As shown in FIG. 5, an engaging projection 15 is projected inwardly of the shutter 3 in the horizontal direction at the intermediate portion of the connecting place 3c of the shutter 3. A torsion coil spring 17 is suspended between the engaging projection 15 and a slot 16 defined on the case 1 so that the shutter 3 is always biassed in the direction of closing the head accessing opening 5. Positions of the shutter 3 and coil spring 17 shown in phantom lines in FIG. 7 represent the opened position. Reference numeral 22 denotes a spring insertion hole, through which the coil spring 17 is inserted into the inside of the case 1 with the coil spring 17 compressed after the shutter 3 is mounted on the case 1, then by releasing the coil spring 17, one end of the coil spring 17 is engaged with the engaging projection 15 and another end is engaged in the slot 16.

Figure 9:
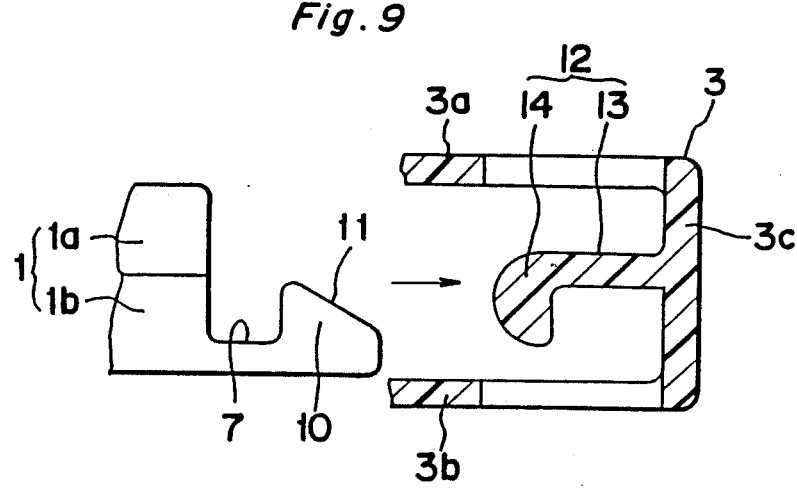
FIG. 9 is a cross sectional view before the shutter is assembled to the cartridge case.
Figure 13:
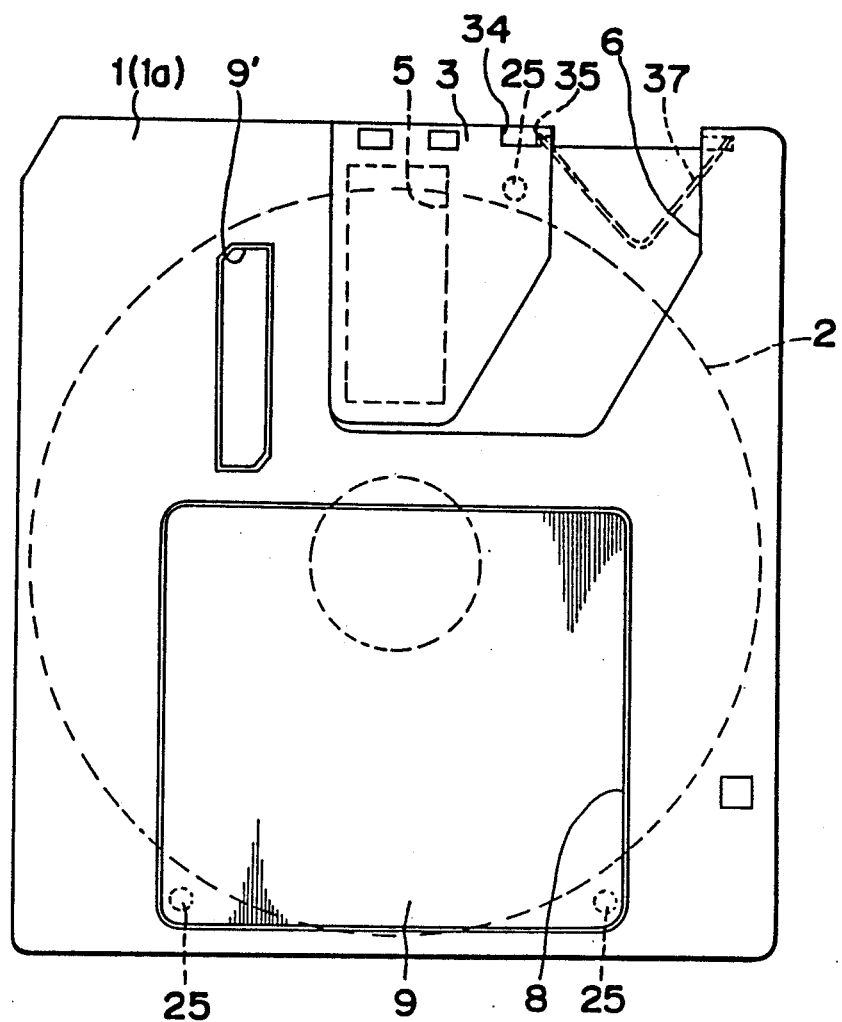
FIG. 13 is a top plan view showing the disc cartridge according to the present invention when not in use.
Figure 14:
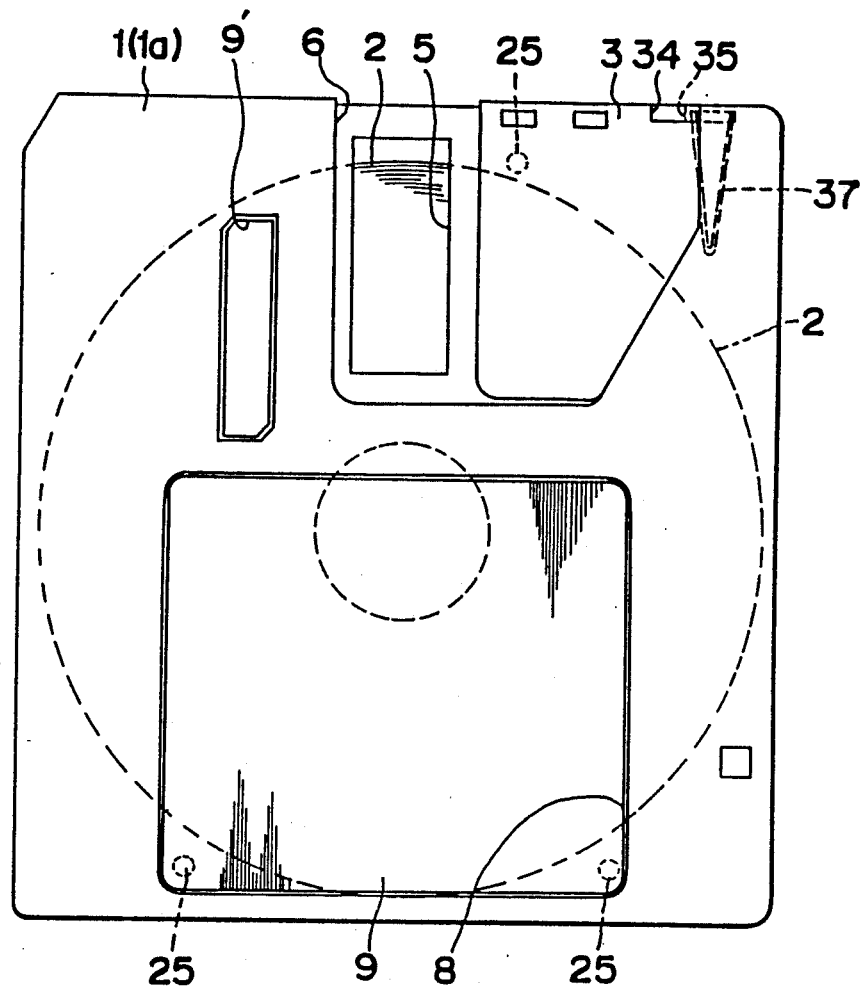
FIG. 14 is a top plan view showing the disc cartridge according to the present invention when in use.

Referring to FIG. 9 showing the case 1 before the shutter 3 is mounted, in mounting the shutter 3, there is no need to expand the plates 3a and 3b as performed in the conventional shutter, because the shutter 3 can be mounted on the case 1 by inserting the case 1 into the space between the plates 3a and 3b, whereby the engaging tip portion 14 abuts onto the inclined surface 11 of the projection rib 10 in the case 1, then by further insertion of the case 1, the resilient member 13 of the engaging tip 12 rides over the projection 10, being resiliently bent and finally the tip portion 14 can be inserted in the slot 7, being engaged with the projection 10. Thus, the shutter 3 can be mounted on the case 1.

As shown in the first preferred embodiment, the inclined surface 11 of the case 1 is formed over the entire length of the projection rib 10; however, this construction is not essential for mounting the shutter 3. For example, a plurality of inclined surfaces 11 may be formed at several regions on the projection rib 10 in an interrupted manner.

FIG. 10 illustrates the second embodiment of the present invention, wherein only one head accessing opening 5 is defined on the top case 1a. In this embodiment, the second plate 3b is not necessary such that the shutter 3 comprises only one plate 3a and the connecting plate 3c with the engaging tip 12 formed on the connecting plate 3c.

FIG. 11 shows the third embodiment of the shutter 3, wherein the first and second plate 3b are formed of metal plates such as stainless steel or aluminum plates, and the connecting plate 3c is formed of resilient synthetic resin materials, such as polyacetal resin or polyamid resin. In order to ensure the connection of the plates 3a and 3b and the connecting plate 3c, there are defined a plurality of holes 18 and the resin materials forming the connecting plate 3c are filled in the holes 18.

FIG. 12 shows the fourth embodiment of the present invention, wherein the shutter 3 is made of a metal plate such as stainless steel or aluminum plate, which is bent in a generally U shape in the side view so that the first plate 3a, connecting plate 3c and the second plate 3b are continued. The projection rib 12 is formed by erasing a part of the connecting plate 3c.

In the third and fourth embodiments, the shape of the cartridge case in particular, the shape of the guide slot 7 and the projected rib 10 and their peripheral portions are substantially similar to those in the first embodiment.

In case the engaging tip 12 is formed of resin materials, as shown in the first and third embodiments, wearing of the engaging tip 12 and the periphery of the guide slot 7 due to the slide motion of the shutter 3 can be decreased compared to the situation when the shutter is formed of the metal plate, a smooth movement of the shutter can be assured and the problem caused by the scraped powder can be effectively suppressed.

By making the first and second plate 3a and 3b of metal, the mechanical strength is high so that the plates 3a and 3b can be made thin with the printability of the surface of the shutter improved.

In place of defining the slot 7 in the case 1 and engaging tip 12 in the shutter, they may be formed in a reversed manner, that is the engaging tip 12 is formed in the cartridge case 1 and the slot 7 in the shutter.

In the embodiments mentioned above, although the shutter 3 is used only to open and close the head accessing opening 5, it may be possible to open and close both the head accessing opening 5 and the opening 4 for insertion of the hub by a long shutter.

The present invention is not limited to the magnetic disc cartridge but can be used for the optical disc cartridge and optical-magnetic disc cartridge.

The fifth embodiment of the disc cartridge with reference to FIGS. 13 to 35.

Figure 15:
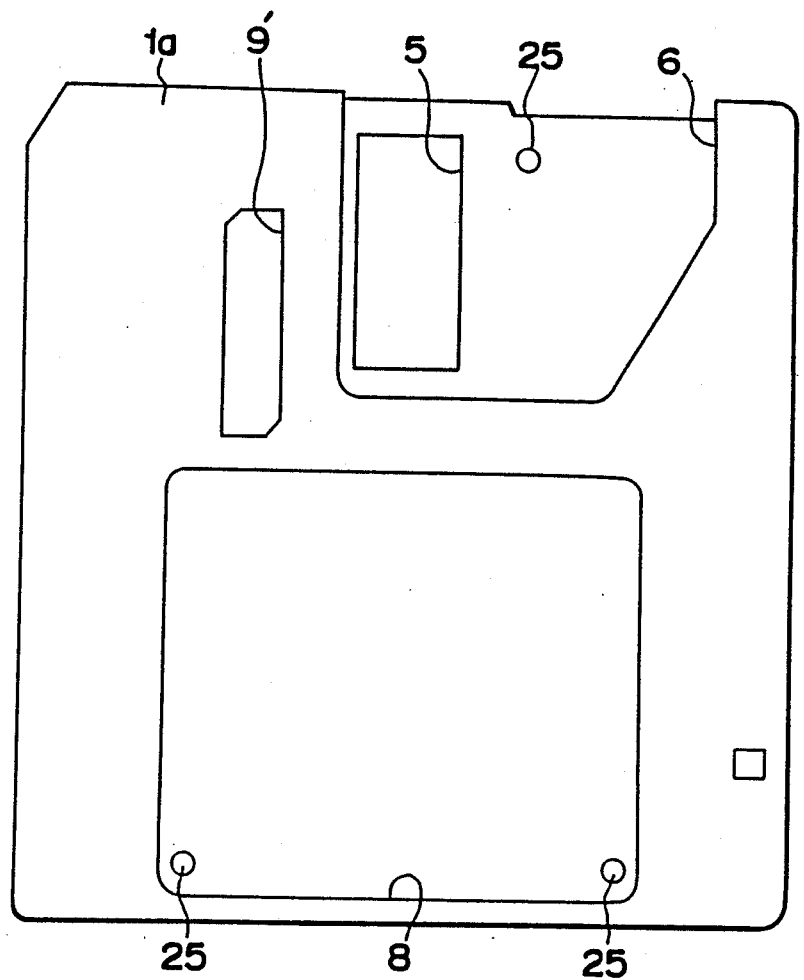
FIG. 15 is a top plan view of a top half case.
Figure 17:
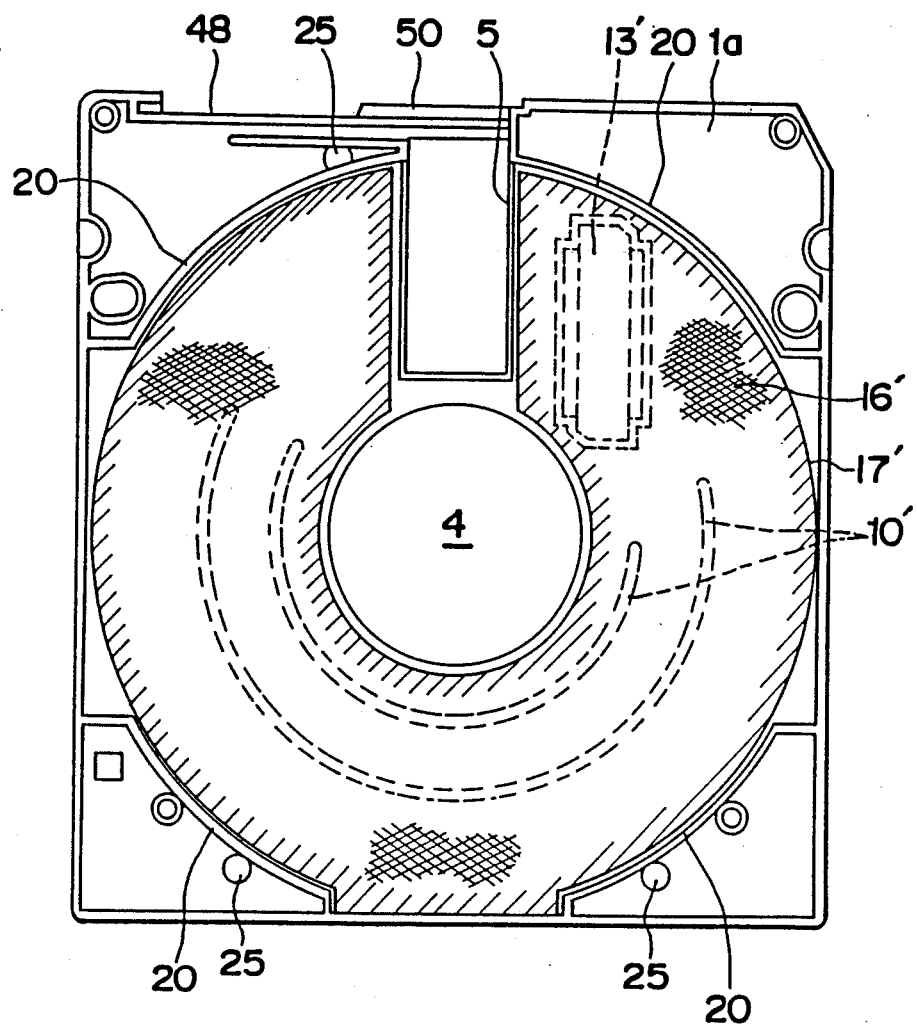
FIG. 17 is a plan view showing inside of the top half case shown in FIG. 15 with a cleaning sheet mounted.

Referring to FIG. 15, at the upper stream side of the rotation of the disc against the head accessing opening 5 in the top half case 1a, a plate pressing opening 9' is defined in an elongated rectangular shape. A label fit area 8' is defined at a region backward of the opening 9' so that the area 8' is slightly sunk from the top surface of the case 1. A label is fitted on the label fit area 8'. The disc chamber 21 is defined by the rib 20. On the region in the disc chamber 21 except for the head accessing opening 5 and the plate pressing opening 9' at least one rib 10, preferably more than two ribs, are formed in a generally coaxial to the rotation center of the disc 2. A pressing plate 13' is detachably fitted in the plate pressing opening 9'. The pressing plate 13' is formed of synthetic resin material in a generally similar shape of the opening 9' with both flanges 14' projected. The flanges 14' are fitted in the recesses 15' of the top half case 1a so as to prevent the pressing plate 13' from being disengaged. After insertion of the pressing plate 13' in the plate pressing opening 9, as shown in FIG. 17, a cleaning sheet 16' made of polypropylene rayon non-woven sheet having a generally similar shape of the disc chamber 21 is placed. The peripheral edges of the cleaning sheet 16' is thermally bonded onto the top half case 1a at the interrupted positions. Thus the pressing plate 13' can be covered by the cleaning sheet 16.

Figure 18:
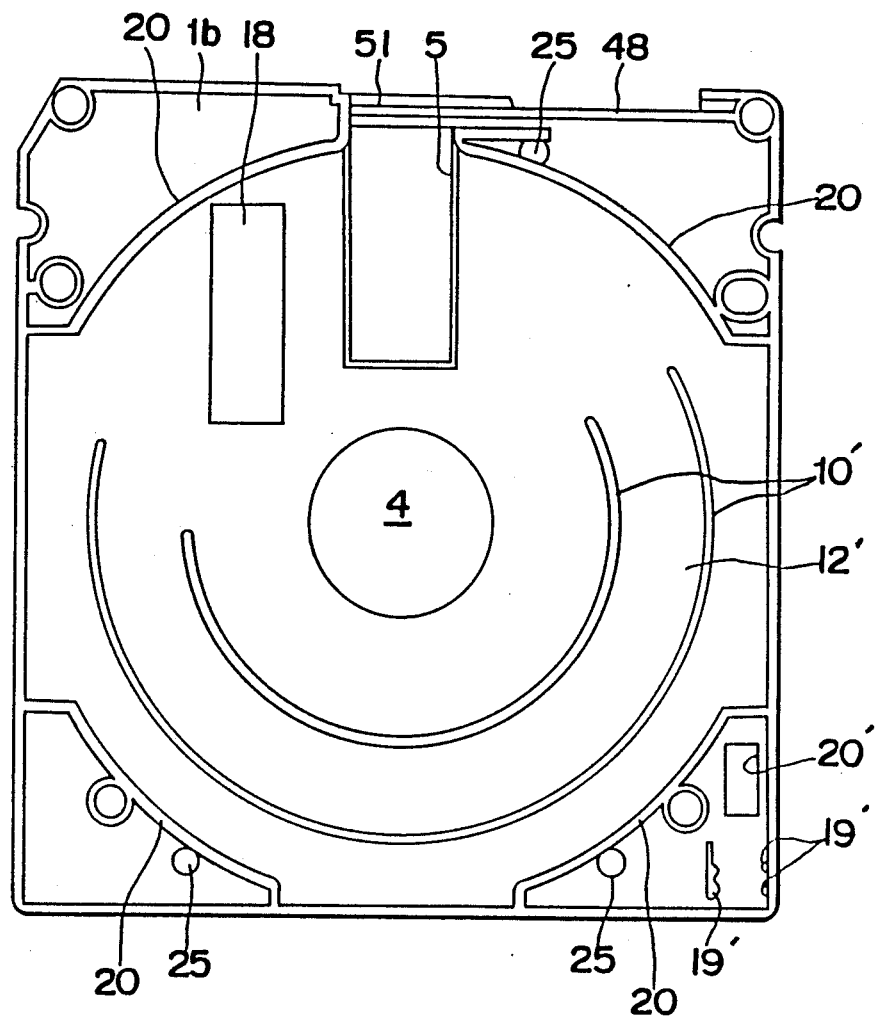
FIG. 18 is a plan view showing the inside of the bottom half case.

As shown in FIG. 18, in the inner face of the bottom half case 1b, a receiving portion 18' is projectingly formed at a position facing to the pressing opening 9'. In the bottom half case 1b, the disc chamber is formed by the ribs 20 formed on each corner of the case 1b and the arcuated ribs 10' are formed coaxial to the rotation center of the disc 2.

Figure 19:
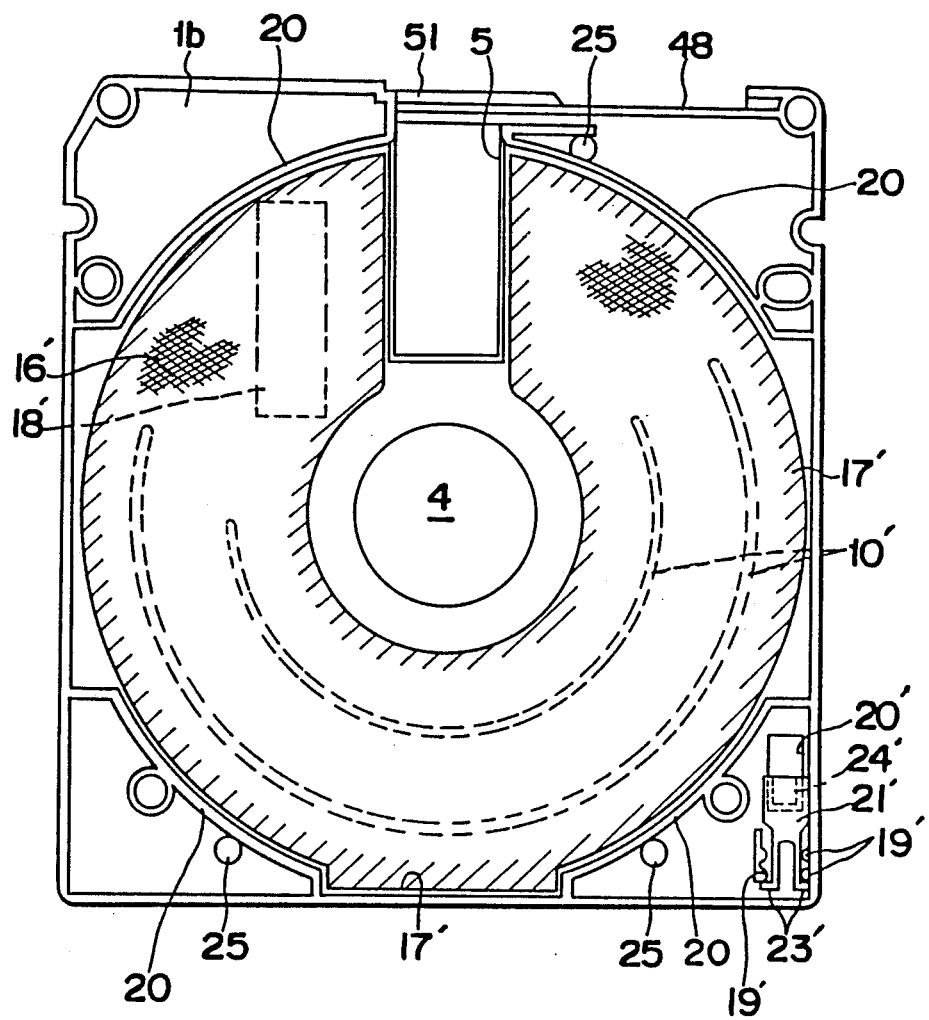
FIG. 19 is a plan view showing the inside of the bottom half case with the cleaning sheet mounted.
Figure 20:
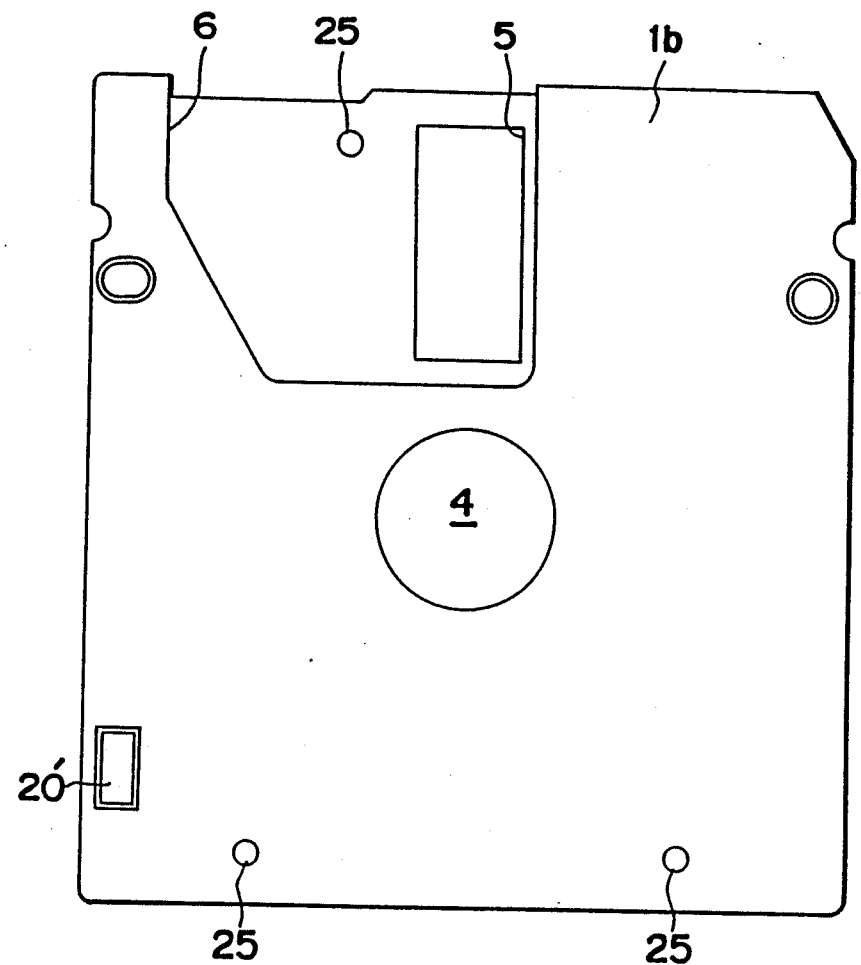
FIG. 20 is a plan view of the bottom half case.

As shown in FIG. 19, another cleaning sheet 16' having a generally C character shape is disposed so as to cover the receiving portion 18' and the peripheral edge of the sheet 16' is thermally bonded.

As shown in FIGS. 18 to 19, a pair of projected members 19' are formed at one corner of the bottom half case 1b and an operation 20' is defined in an elongated rectangular shape near the projected members 19'. A write protector 21' for preventing erroneous erasing is disposed over the region from the operation opening 20' to the projected members 19'. The write protector 21' comprises a main body 22' and legs 23' projected parallel from the main body 22' and the legs 23' are resiliently engaged in with the projected members 19' and an operating member 24' formed on the main body 22' is inserted in the operation opening 20'. The position of the write protector 21' shown in FIG. 19 is the position for preventing erasure and by sliding the write protector 21' along the longitudinal direction of the operation opening 20', the free ends of the legs 23 move beyond the projections of the projected members 19' so that the write protector 21' can be moved to the position of allowing to write-in.

Referring numeral 25 in FIGS. 15 to 20 denotes gate traces. The top half case 1a and the bottom half case 1b are formed by injection molding. One of the gates for molding the top half case 1a and bottom half case 1b are respectively defined at the position in the recess 6. The recessed potion 6 is relatively thin compared to the other portions of the cartridge case, and the gap of the mold of the recessed portion 6 is narrow. Therefore, if the gate is provided on the portion other than the recessed portion 6, there tend to occur failure of resin injection. In order to avoid this problem, the injection gate is provided at the position corresponding to the recessed portion 6. By providing the exclusive injection gate for the recessed portion 6, the injection pressure and maintaining pressure from the exclusive injection gate can be different from those in the other gates, so that moldability of the half case can be improved.

The position of the gate trace 25 is designated so that the gate trace 25 can be concealed by the shutter 3 when the shutter 3 is in the closed position or in the opened position. In the case of the top half case 1a, the other two gate traces are so designated that they are formed in the label fit area 8, whereby the gate trace 25 can be concealed by the label 9'.

The shutter 3 is made of synthetic resin materials such as polyacetal resin or polyamid resin with a predetermined resiliency deformable easier than the cartridge case 1. The shutter 3 is formed by a first flat plate 26, second flat plate 27 opposing in parallel with the first plate 26 and a connecting plate 28 for connecting both plates 26 and 27, so that the shutter 3 is formed generally in a U character shape in a side elevational view and in a trapezoid shape in plan view with a sufficient area for closing the head accessing opening 5.

Two engaging tips 29 which are deformable resiliently are projected from the connecting plate 28 toward the case 1 with a predetermined interval along the movement of the shutter 3. Each of the engaging tips 29 comprises a column like memeber 30 projected perpendicular to the connection plate 28, and an upper engaging piece 31 and a lower engaging piece 32 formed on the free end of the column like member 30.

Figure 25:
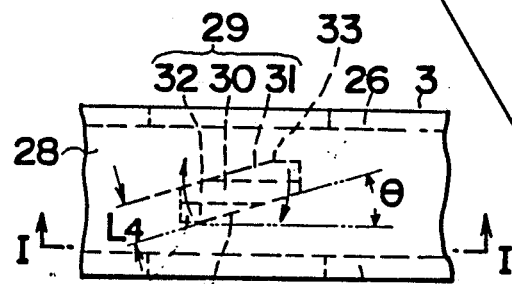
FIG. 25 is a partial view of the shutter shown in FIG. 21.
Figure 26:
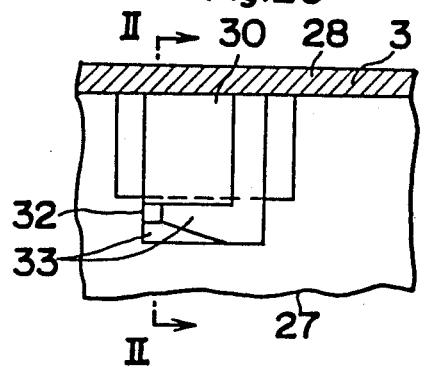
FIG. 26 is a partial cross sectional view taken along the line I—I in FIG. 25.
Figure 27:
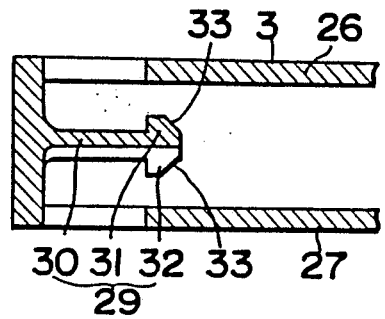
FIG. 27 is a partial cross sectional view taking along the line II—II in FIG. 26.

As shown in FIG. 31, the upper engaging member 31 is directed to the inside of the top half case 1a and the lower engaging piece 32 is directed to the inside of the bottom half case 1b. Also, as shown in FIGS. 25 to 27, each of the upper and lower engaging pieces 31 and 32 is provided with two inclined surfaces 33 formed on the upper surface and lower surface of the right half and left half alternately so as to help deformation of the engaging pieces 31 and 32 when they are inserted in the inside of the case 1. The engaging pieces 31 and 32 have a parallelogram shape when viewed from the front with the inclination angle of the inclined surface 33 ranging from 5° to 45° and preferably 10° to 30°. The engaging pieces 31 and 32 are symmetrical, as shown in FIG. 22.

Figure 21:
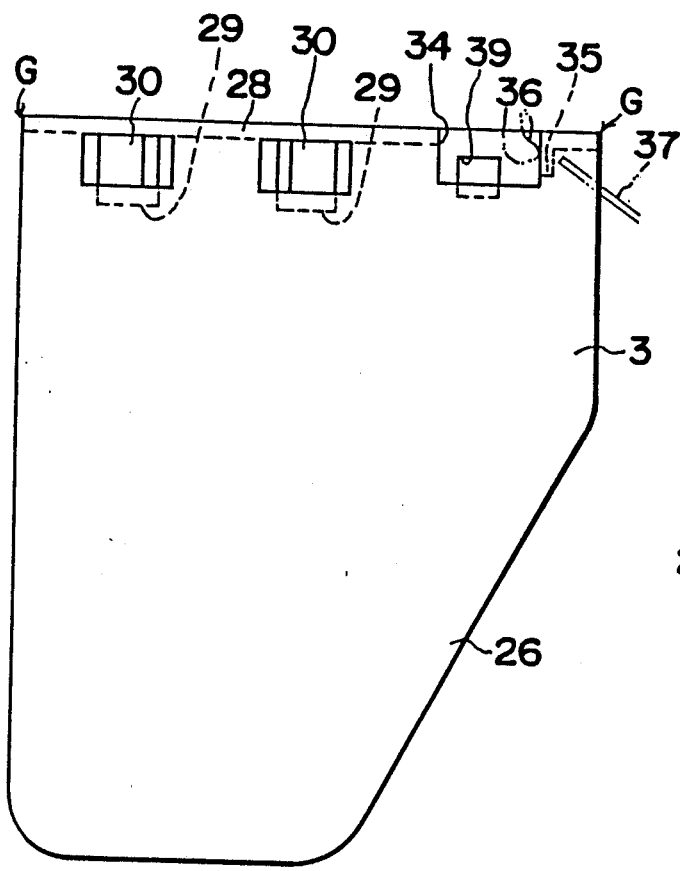
FIG. 21 is a plan view of a shutter.
Figure 23:
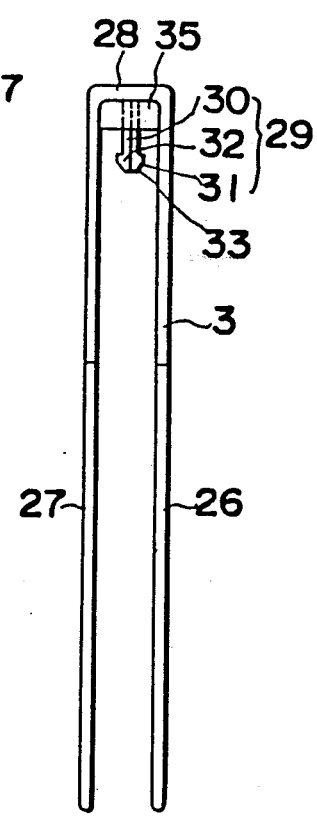
FIG. 23 is a side view of the shutter shown in FIG. 21.
Figure 22:
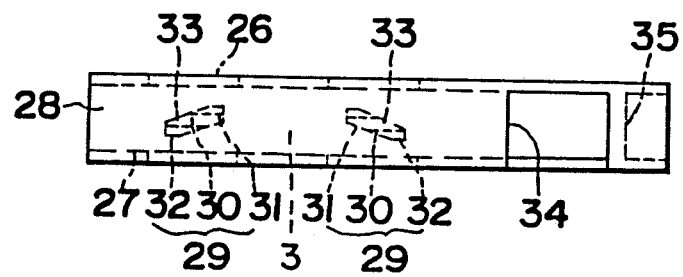
FIG. 22 is a front view of the shutter shown in FIG. 21.

As shown in FIGS. 21 and 22, there is defined a cut portion 34 across a part of the first plate 26 to a part of the connecting plate 28 and a butting wall 35 is formed near the end of the cut portion 34. The butting wall 35 is coupled with the inner surfaces of the respective first and second plates 26 and 27 and the connecting plate 28 to reinforce the butting wall 35. The outer surface of the butting wall 35 facing to the cut portion 34 provides an engaging surface to which an opening member 36 of a disc drive device faces for opening the shutter 3, as shown in FIG. 21.

On the other hand, the inner surface of the butting wall 35 provides another butting wall to which an end of the spring member 37 is engaged for resiliently biassing the shutter 3 toward the closing direction. A blind recess is defined between the first and second plates 26 and 27 and the connecting plate 28. Therefore, the spring member 37 recessed in the recess mentioned above is not disengaged from the recess.

Figure 24:
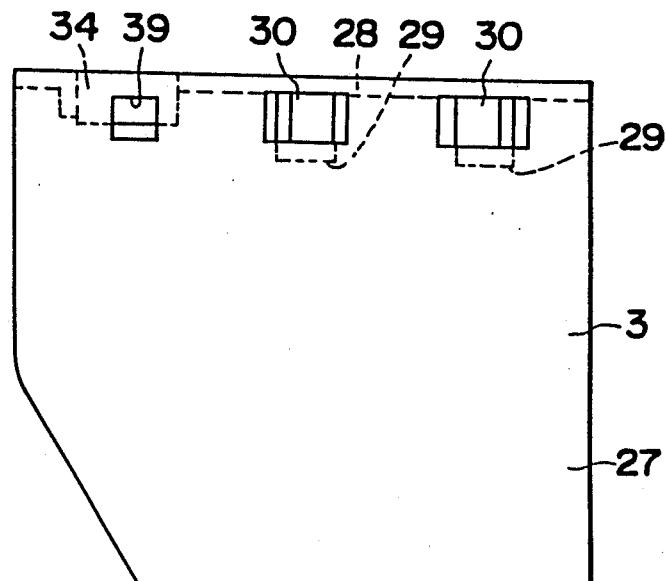
FIG. 24 is a bottom view of the shutter shown in FIG. 21.

As shown in FIG. 21 and 24, there is defined a dummy hole 39 in the second plate 27 corresponding to the recess 34 so as to improve the moldability of the shutter 3, in particular to decrease the difference of the thickness of the first plate 26 and the second plate 27. The details thereof will be explained with reference to FIG. 32.

Figure 32:
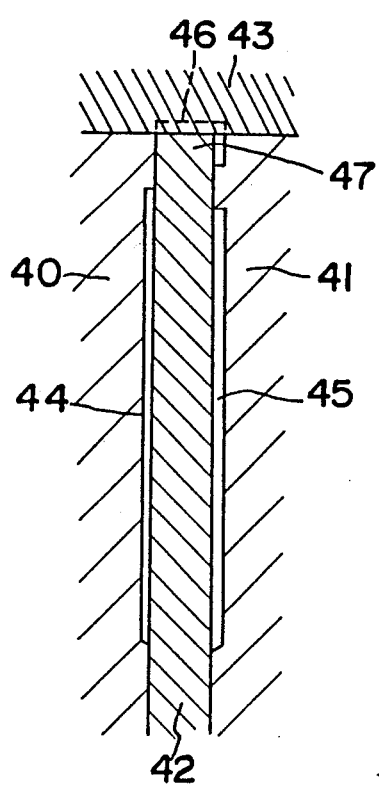
FIG. 32 is a cross sectional view showing the mold for the shutter.

As shown in FIG. 32, the mold for the shutter 3 comprises side cores 40 and 41, a fixed core 42 fixedly disposed between the side cores 40 and 41 and a top half core 43. A space 44b for the first plate 26 is formed between the side core 40 and fixed core 42, a space 45 for the second plate 27 is formed between the side core 41 and the fixed core 42 and a space 46 for the connecting plate 28 is formed between the fixed core and the top core 43. The recess 34 is formed by the part of the side core 40 and the dummy hole 39 is formed by the part of the side core 41.

When the shutter 3 is molded by injecting the resin materials through the gate G shown in FIG. 21, if the mold is defined so that only the recess 34 is formed in the first plate 26, the flowing resistance of the molten resin in the space 44 is greater than that of in the space 45. In case an end 47 of the fixed core 42 is not supported on the both sides by the side cores 41 and 42 the molten resin tends to flow in the space 45, since the flow resistance of the space 45 is lower than that of the space 44, and the fixed core is inclined toward the side core 40 by the resin pressure. Thus, the second plate 27 is made thinner than the first plate 26 and mold failure may occur in the worst case.

In order to avoid such a drawback, in the present embodiment, the end 47 of the fixed core 42 is supported by the slidable side cores 40 and 41 so that the width of the space 44 and 45 can be kept constant. By the arrangement mentioned above, the fixed core 42 is prevented from being inclined so as to assure the same thickness of the first and second plates 26 and 27. The dummy hole 39 can be formed by insertion of a part of the side core 41 into the space 45.

Figure 16:
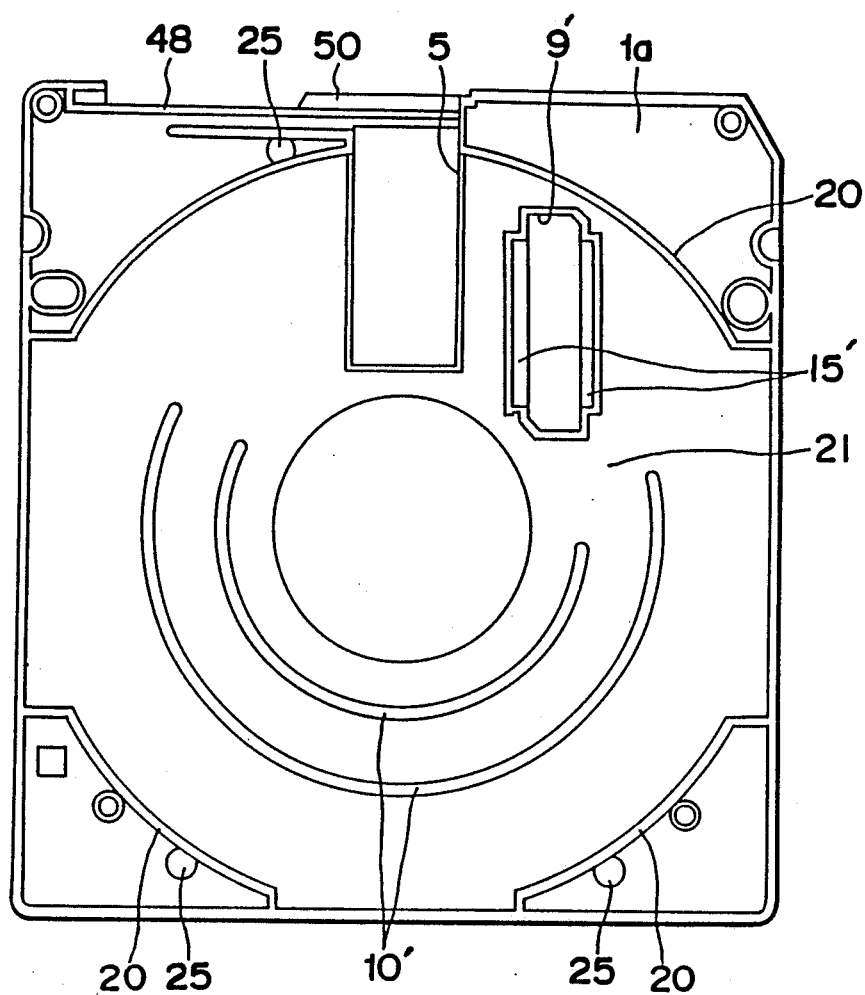
FIG. 16 is a plan view showing inside of the top half case shown in FIG. 15.
Figure 33:
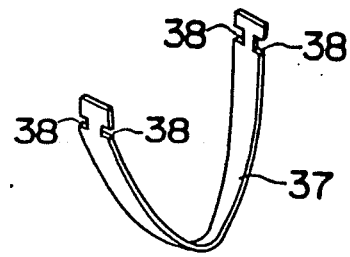
FIG. 33 is a perspective view showing a spring.
Figure 34:
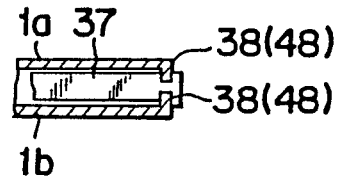
FIG. 34 is a cross sectional view showing the relation of the spring and the case.
Figure 35:
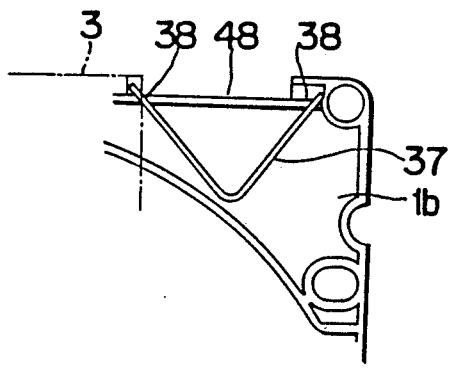
FIG. 35 is a partial plan view showing the condition of the spring assembled in the case.

Referring to FIG. 33, the spring member 37 consists of a V shaped resilient plate with a pair of cut portions 38 defined on both end portions of the spring member 37. The arrangement of the spring member 37 and the half cases 1a and 1b is shown in FIGS. 34 and 35. At the front edge portions of the half cases 1a and 1b, projection ribs 48 are formed to prevent disengagement of the spring member 37 from the shutter 3. The cut portions 38 are slidably engaged with the projection ribs 48. The projection ribs 48 extend in the direction of expansion and compression of the spring member 37, as shown in FIGS. 16, 18 and 35.

Figure 36:
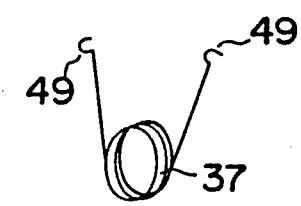
FIG. 36 is a perspective view of another spring.
Figure 37:
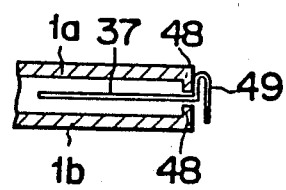
FIG. 37 is a cross sectional view showing the condition of the spring and the case.

A modification of the spring member 37 is shown in FIG. 36 and the arrangement of the spring member 37 and the case 1 is shown in FIG. 37.

The modified spring member 37 is made of a coil spring with both ends thereof bent in a U character shape at 49 and the bent portions 49 are abutted onto the projection ribs 48 formed on the top half case 1a and bottom half case 1b, whereby undersired entrance of the modified spring member 37 in the inside of the case 1.

Figure 38:
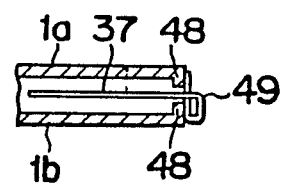
FIG. 38 is a cross sectional view showing a modification of the spring assembled to the case.

A further modification of the spring member 37 is shown in FIG. 38, wherein the spring member 37 is made of a coil spring 37 with both ends thereof formed a rings 49, which are engaged with the projection rib 48.

In case of using the spring member 37 shown in FIG. 35, the spring member 37 is assembled in the case 1 at the time of assembling of the top half case 1a and bottom half case 1b. In case of using the modified spring members 37 shown in FIGS. 37 and 38, the spring member is assembled after the top and bottom half cases 1a and 1b are combined together.

The way of assembling of the shutter to the case 1 is explained hereinafter. As shown in FIGS. 16 to 18, the projection rib 48 extends to the corner of the case 1 crossing the front portion of the head accessing opening 5. An upward inclined surface 50 is formed in an upward direction in the front portion of the shutter inserting position (in front of the head accessing opening 5) at the rib 48 of the top half case 1a (see FIG. 30). A downward inclined surface 51 is formed in a downward direction the front portion of the shutter inserting position (in front of the head accessing opening 5) at the rib 48 of the bottom half case 1b. As shown in FIG. 30, when the top half case 1a and bottom half case 1b are assembled together, an opening 52 is defined between the two projection ribs 48. The size L1 of the opening 52 between the top and bottom is greater than the size L2 of the column portion 30 in the shutter 3 but is smaller than the size L3 between the upper engaging tip 31 and the lower engaging tip 32. Therefore, L2<L1<L3. The size L1 is equal to or greater than the distance L4 between the end of the upper engaging tip 31 in the direction perpendicular to the inclination of the surface 33 and the end of the lower engaging tip 32. When the shutter 3 is mounted on the case 1, there is no need to expand the first and second plates 26 and 27 as performed in the conventional shutter, it is sufficient to insert the shutter 3 directly to the case 1 toward the shutter insertion position (the position where the upward inclined surface and lower inclined surface are formed). In the process of the insertion of the shutter 3, the inclined surface 33 of the upper engaging tip 31 engages with the upward inclined surface 50. On the other hand, the inclined surface 33 formed on the lower engaging tip 32 engages with the downward inclined surface 51. By the further insertion of the shutter 3, since the distance between the upward inclined surface 50 and the downward inclined surface 51 is gradually decreased, the column portion 30 is twisted, guided by the inclined surfaces 50 and 51, then the engaging tips 31 and 32 pass the opening 52. The inclined surfaces 50 and 51 are provided so as to help the torsion of the column portion 30. When the inclined surfaces 50 and 51 pass over the opening 52, the column portion 30 recovers its original state, whereby the upper engaging tip 31 engages with the rib 48 of the upper half case 1a and the lower engaging tip 32 engages with the rib 48 of the lower half case 1b to prevent disengagement of the shutter 3 from the case 1 and the column portion 30 can be slidably assembled in the opening 52. Thus, assembling of the shutter 3 is completed.

Figure 39:
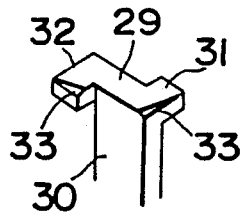
FIG. 39 is a perspective view showing an example of the engaging tip.

FIG. 39 shows a modification of the engaging member 29 of the shutter 3, wherein the engaging tips 1 and 32 have a rectangular shape in plan view and the inclination surface 33 is formed on the corner of the rectangular shaped portion.

Figure 40:
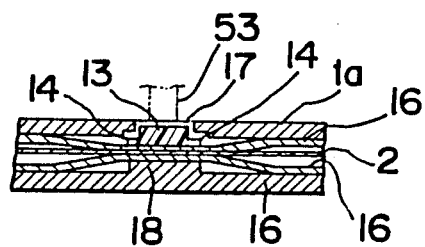
FIG. 40 is a cross sectional view showing the condition of the pressing plate at the time of using the disc.

FIG. 40 shows the portion near the pressure plate 13 at the time of using the disc cartridge. When the disc cartridge is in use, the pressure plate 13 is pushed toward the receiving portion 18 in a light force by a pressing member 53 made of a spring plate of the disc drive. Thus, the magnetic disc 2 is held by two cleaning sheets 16 between the pressure plate 13 and the receiving portion 18 so as to clean the surface of the magnetic disc 2.

In the various embodiment, the shutter is provided with one or more engaging projections, which are engaged with the engaging rib formed in the cartridge case so that the shutter 3 can be slidably engaged with the cartridge case. Therefore, the shutter assembly according to the present invention can be easily mounted to the cartridge case without expansion of the shutter as performed in the conventional shutter, and in addition the shutter is prevented from unstable mounting to the case due to the expansion mentioned above.

The engaging projections formed on the shutter have the upper engaging tip and lower engaging tip projected toward the inside of the cartridge case. Therefore, even if the shutter is subjected to the vertical vibration, the engagement of the upper engaging tip and the rib of the upper half case and the engagement of the lower engaging tip and the rib of the lower half case prevent disengagement of the shutter from the cartridge case.

Moreover, provision of the column like member which is twisted when the projection is inserted in the cartridge case makes it possible to mount the shutter to the catridge case easily.

Moreover, there is formed a butting wall in the inside of the shutter in a direction crossing the sliding direction of the shutter, and the butting wall is used to receive the spring member 37 for biasing the shutter, and failure in engagement of the spring can be effectively avoided.

Referring to FIGS. 41 to 61, the sixth embodiment of the disc cartridge according to the present invention is explained. Before the description proceeds, it is noted that like parts are designated by the like reference numerals and the explanation thereof is herein omitted.

The length of the pressing plate 13' is slightly longer than the width in the radial direction of the recording area of the magnetic disc 2. The pressing plate 13' is vertically movably fitted in the plate pressing opening 9'.

Figure 44:
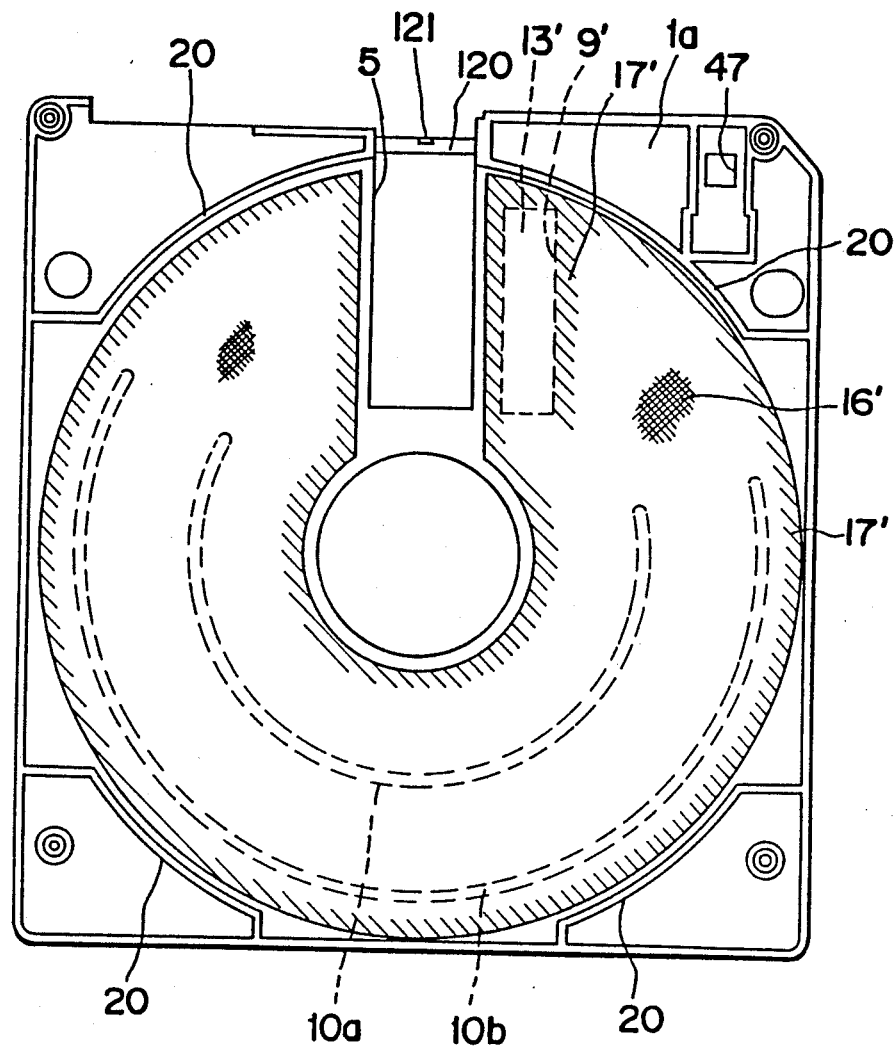
FIG. 44 is a plan view of the top half case with the cleaning sheet mounted.

As shown in FIG. 44, peripheral edge portions of the plate pressing opening 9' are sealed by the cleaning sheet 16' by thermal bonding shown at 17'. By this arrangement, the pressing plate 13' can be prevented from disengagement from the opening 9' by the vibration of the case 1 at the time of assembling of the disc cartridge. Two arcuated ribs corresponding to the ribs 10' in FIG. 16 are shown at 10a and 10b.

Figure 45:
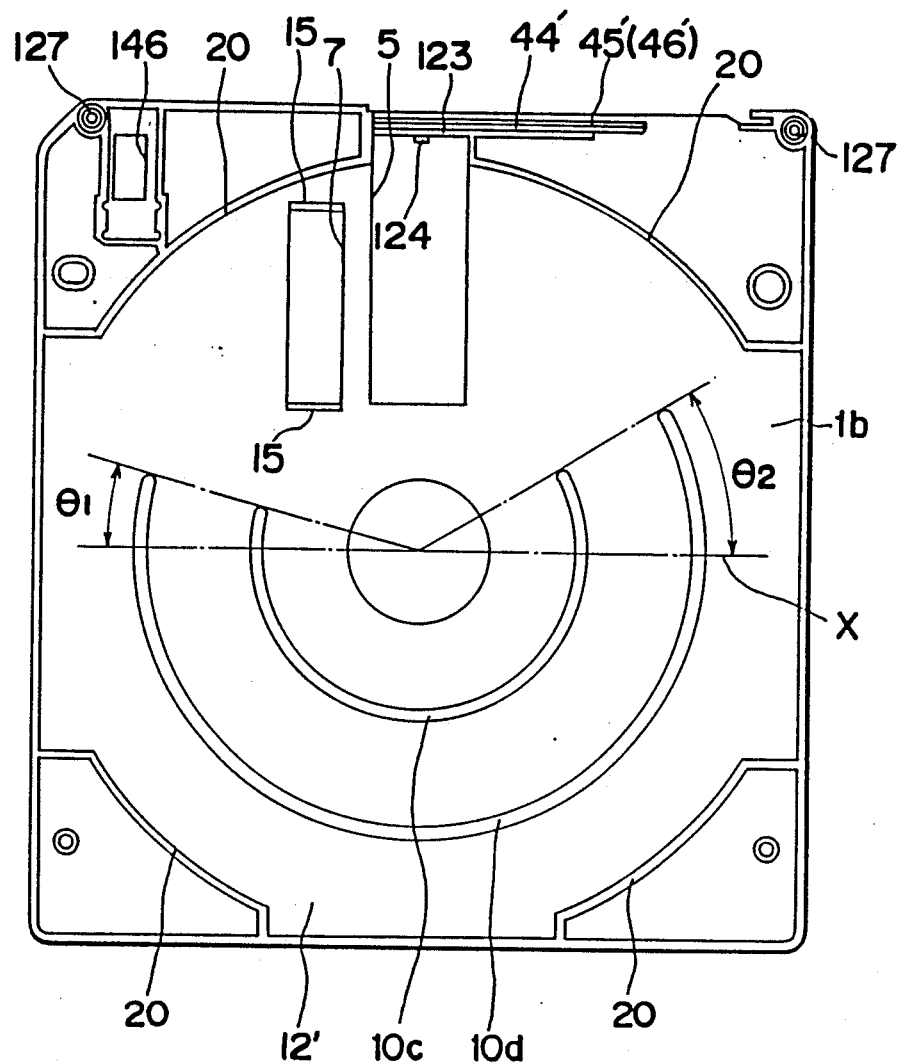
FIG. 45 is a plan view of the bottom half case.

As shown in FIG. 45, there is defined the plate pressing opening 9' in the bottom half case 1b corresponding to the opening 9' of the top half case 1a. The two ribs are shown at 10c and 10d.

A write protector chamber 146 of a rectangular shape is formed inside of the bottom half case 1b and the write protector (not shown) is movably fitted therein in a similar manner as in the above mentioned embodiment. When a detection hole 147 (FIGS. 41 and 42) is closed by the write protector, write to the magnetic disc 2 can be inhibited. When the detection hole 147 is opened by the motion of the write protector, write to the magnetic disc 2 is enabled.

Figure 46:
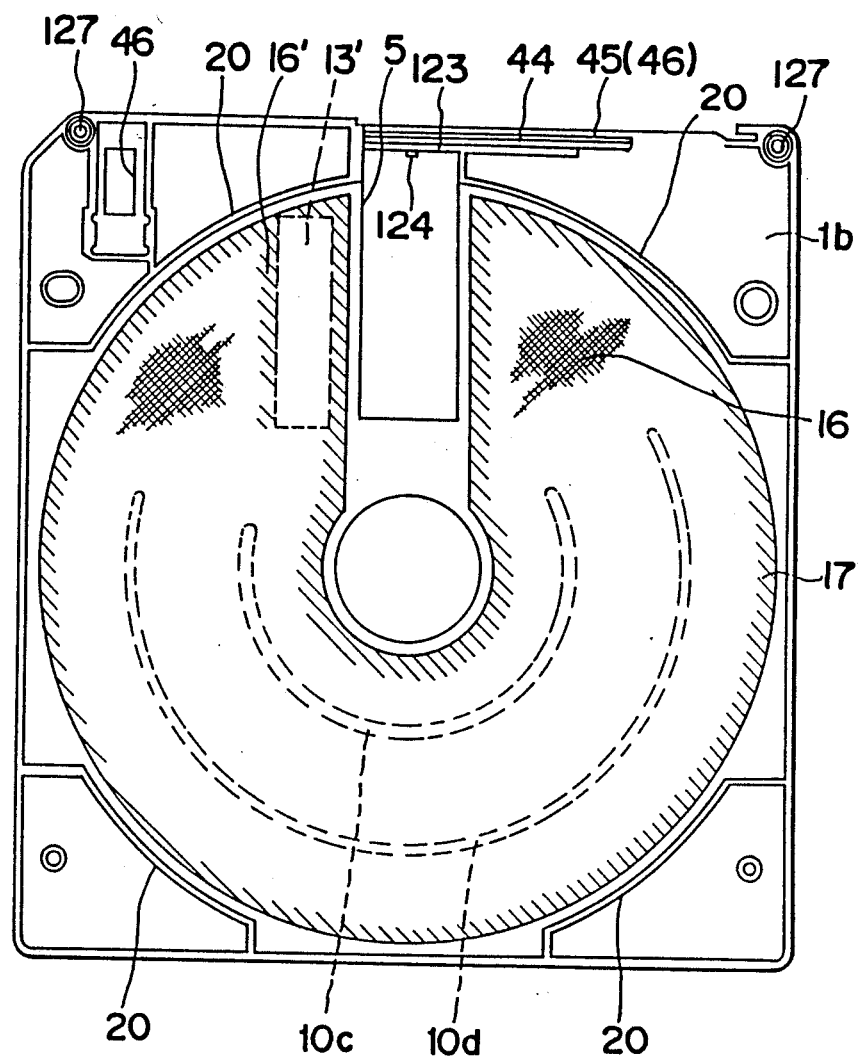
FIG. 46 is a plan view of the bottom half case with the cleaning sheet mounted.
Figure 47:
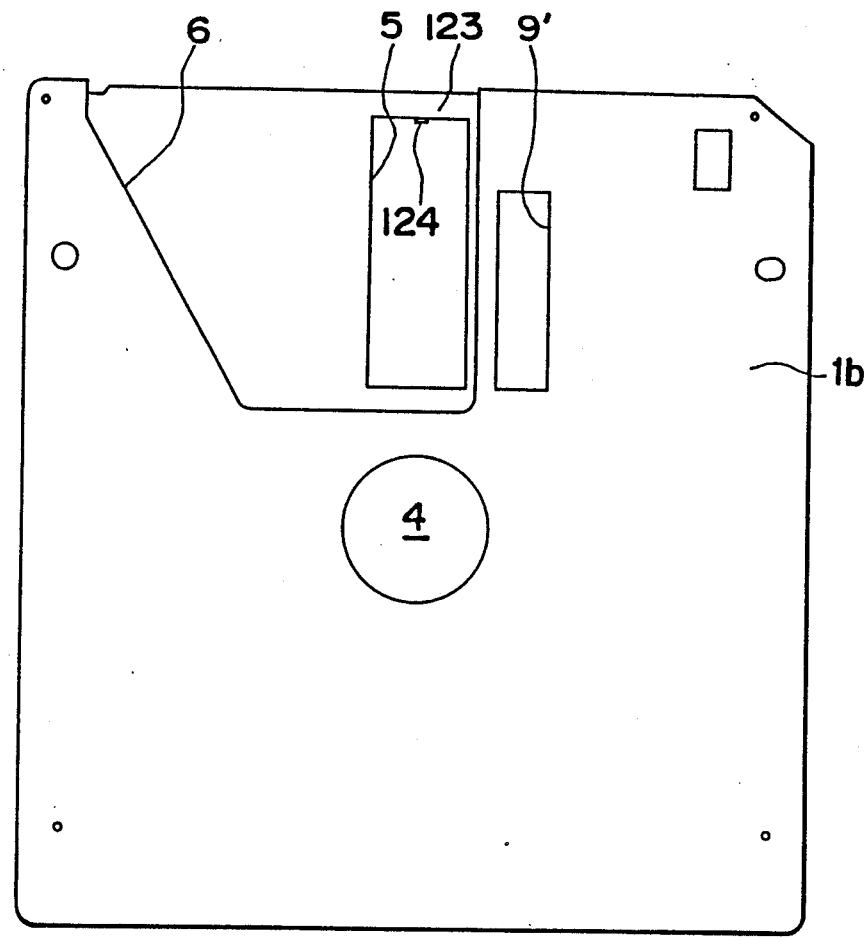
FIG. 47 is a plan view of the bottom half case.
Figure 48:
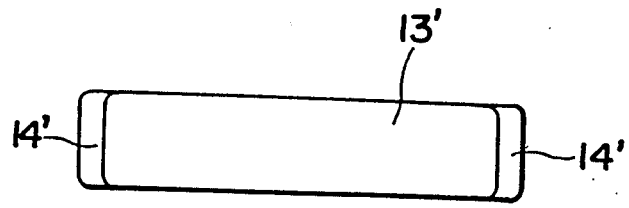
FIG. 48 is a plan view showing the pressing plate.
Figure 49:
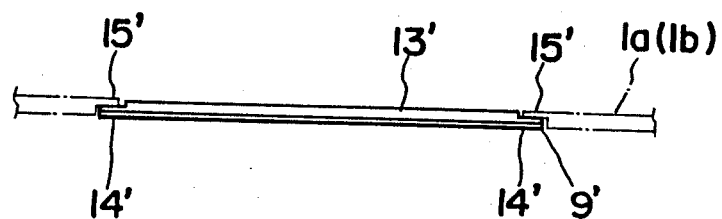
FIG. 49 is a side view of FIG. 48.

As shown in FIG. 46, after insertion of the pressing plate 13' in the plate pressing opening 9', the cleaning sheet 16' having generally C character shape is put in the disc chamber 12' of the bottom half case 1b so as to cover the pressing plate 13' and the peripheral edges of the cleaning sheet 16' are thermally bonded at 17'.

Figure 55:
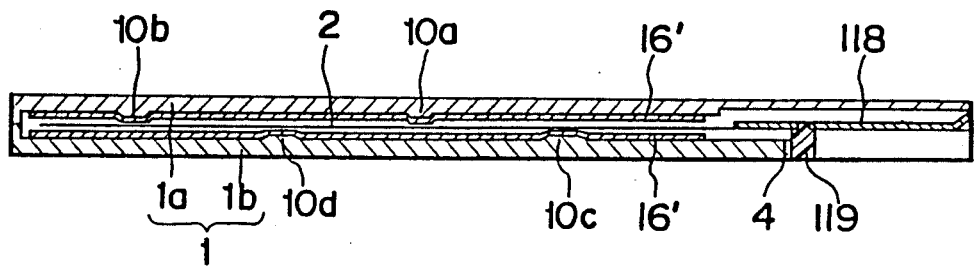
FIG. 55 is a cross sectional view of FIG. 54.

The magnetic disc 2 mounted in the case 1 is attached to an outer peripheral edge of a hub 118 made of stainless steel disc, as shown in FIG. 55. An annular rib 119 is formed on the bottom half case 1b around the opening 4 below the hub 118, thereby preventing an excessive displacement of the magnetic disc 2.

In connecting the top half case 1a and bottom half case 1b a connection at the central portion of the front edge portion of the case 1 is made in addition to the connections at the respective corners. The arrangement of the connection at the central portion will be explained hereinafter with reference to FIGS. 50 to 52.

Figure 50:
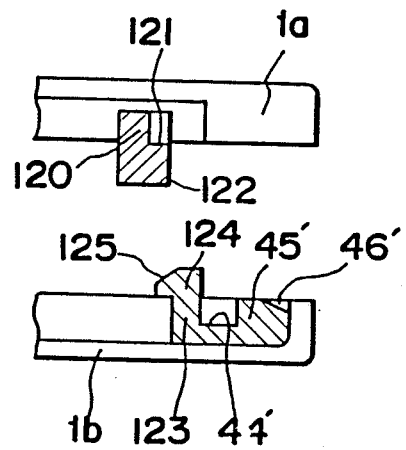
FIG. 50 is a partial cross sectional view showing the relation of the connecting members.
Figure 51:
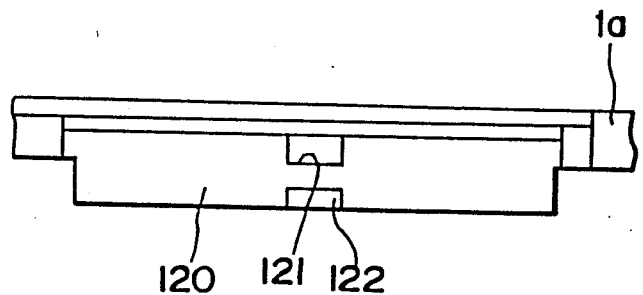
FIG. 51 is a front view of a connecting members.

Since the head accessing opening 5 must have a predetermined length corresponding to the recordable width of the recording disc 2, a thin bar 120 is laid in the front portion of the head accessing opening 5 of the recess 6 of the top half case 1a, and this portion is weakest and deformation occurs in this portion at the time of molding. In order to avoid this problem, an engaging step 121 is formed at the outer side of the central portion of the bar 120, as shown in FIGS. 50 and 51, with a slanted surface 122 formed below the step 121.

Figure 52:
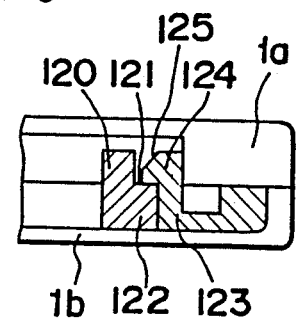
FIG. 52 is a partial cross sectional view showing the condition of the top half case and bottom half case connected together.

On the other hand, when a thin bar 123 is laid in the front portion of the head accessing opening 5 of the recess 6 of the bottom half case 1b, then this portion is weakest and deformation occurs in this portion at the time of molding. In order to avoid this problem, an engaging tip 124 having a slanted surface 125 is formed at the inner side of the central portion of the bar 123, as shown in FIGS. 50 and 52.

When assembling the top half case 1a with the bottom half case 1b, the engaging tip 124 rides over the step 121 and engaged with the step 121 guided by the slanted surfaces 122 and 125. By the engagement, the top half case 1a and the bottom half case 1b can be connected at the front and central portion of the case 1, whereby undesired deformation of the case 1 can be prevented.

Figure 41:
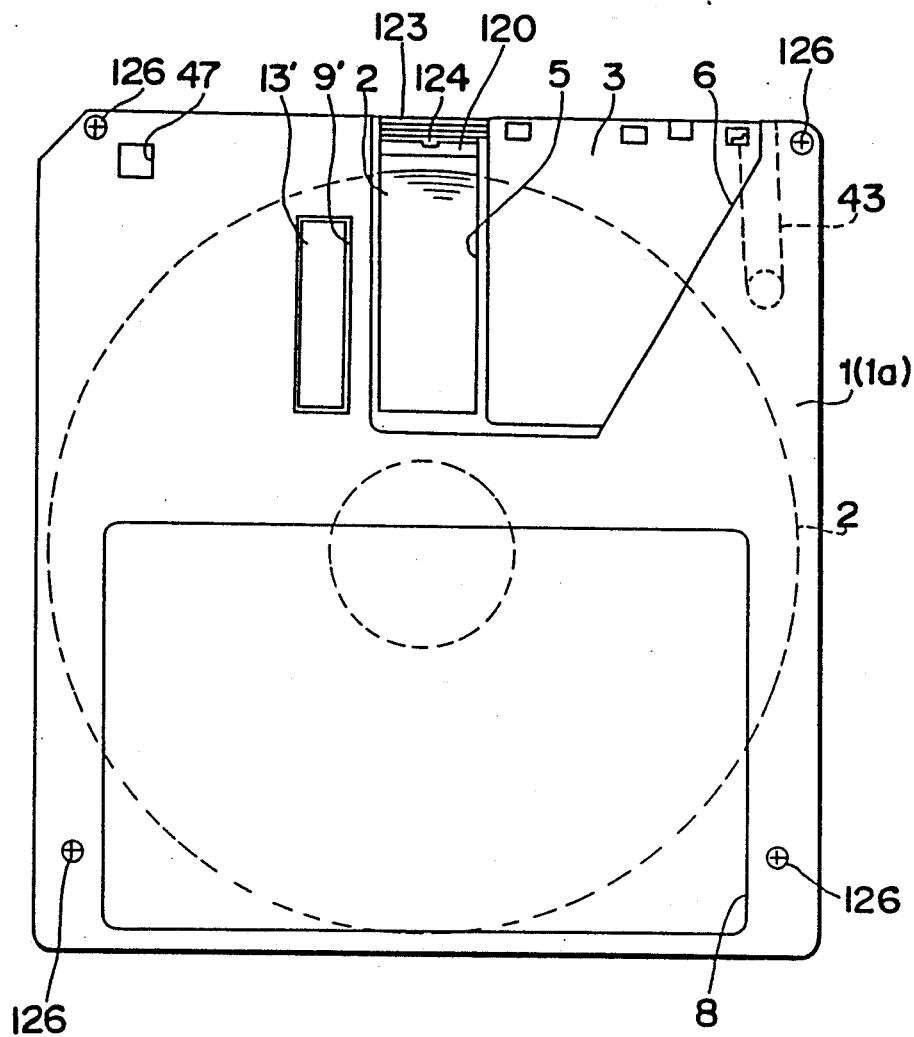
FIG. 41 is a plan view of the disc cartridge according to the present invention.
Figure 42:
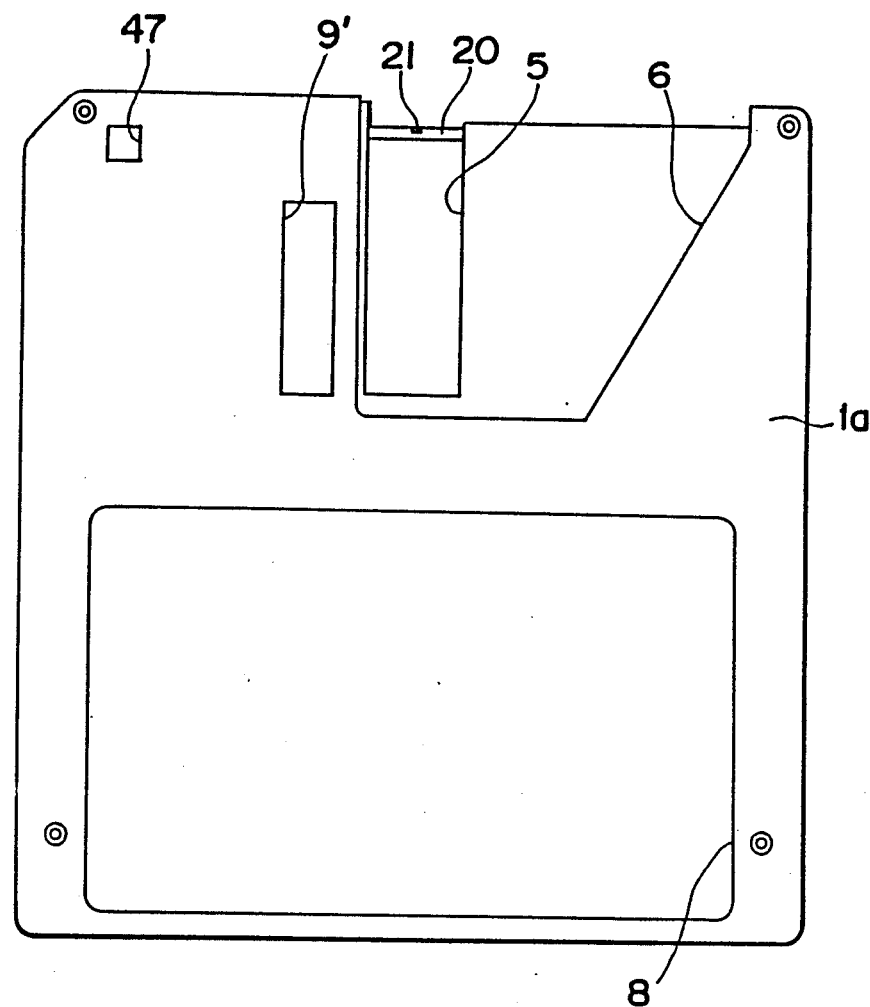
FIG. 42 is a plan view of the top half case shown in FIG. 41.
Figure 43:
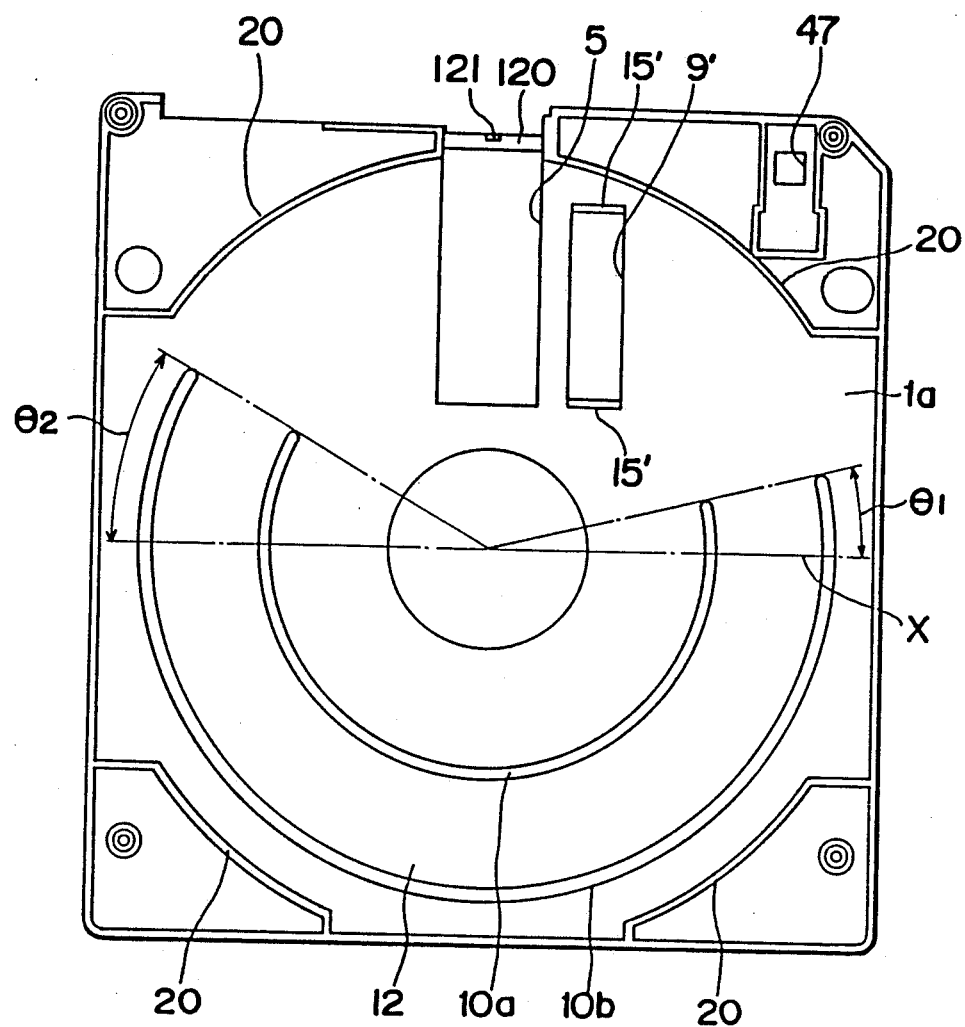
FIG. 43 is a plan view of the top half case showing the inside thereof.
Figure 53:
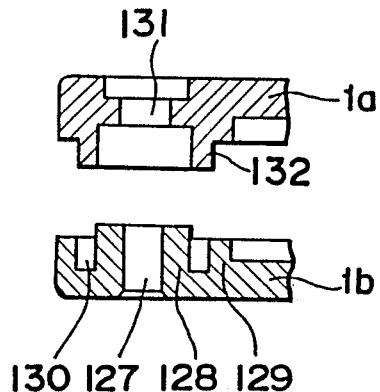
FIG. 53 is a partial cross sectional view showing the condition of the top half case and bottom half case before being connected.
Figure 54:
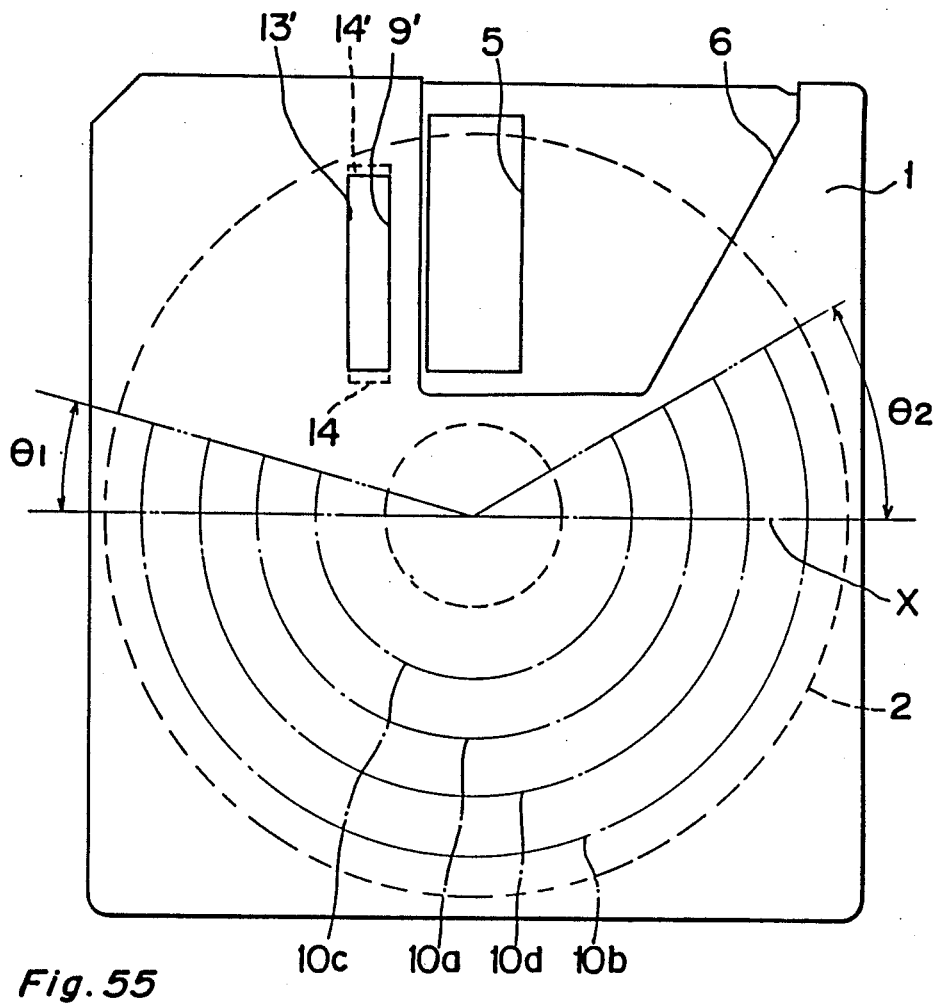
FIG. 54 is a plan view showing the condition of the arcuated ribs used in the disc cartridge.

After the top half case 1a and bottom half case 1b are assembled together, they are further connected at four corners of the case 1 by tapping screws 126, as shown in FIG. 41. Referring to FIG. 53, in the bottom half case 1b, an inner cylindrical boss 128 and an outer cylindrical wall 129 are formed around the tapping hole 127 coaxially each other whereby an annular slot 130 is defined between the boss 128 and wall 129. On the other hand, a cylindrical wall 132 is formed around the screw hole 131 in the top half case 1a. The boss 128, and walls 129 and 132 are formed on four corners of the case 1. Thus, when the top half case 1a and the bottom half case 1b are assembled together, the wall 132 is fitted in the slot 130 and the screw hole 131 opposes the tapping hole 127. In this condition, the tapping screw 129 is screwed through the hole 131 into the tapping hole and the top half case 1a and bottom half case 1b are connected together. In case scraped pieces are produced at the time of tapping, the scraped pieces are deposited in the slot 130 so that the scraped pieces can not enter the inside of the case 1.

When the disc cartridge formed in a manner as mentioned above is mounted in the disc drive, the upper pressing plate 13' is pushed upward by a support 233 of the disc drive with the lower cleaning sheet 16' relative to the bottom half case 1b. On the other hand, the upper pressing plate 13' is pushed downward by the spring 234 of the disc drive with the upper cleaning sheet 16' of the top half case 1a, whereby the magnetic disc 2 is held resiliently with a light force by the cleaning sheets 16' at the position of the upper stream side relative to the head accessing opening 5 and the disc 2 can be cleaned by rotation thereof.

In order to prevent disengagement of the pressing plates 13' from the top half case 1a and bottom half case 1b, there must be provided flanges 14' on each pressing plate 13' and stepped portions 15'. The flanges 14' may be provided on the entire peripheral edges of the pressing plate, on the long side edges thereof or short side edges thereof as shown in the present embodiment. In the embodiment of providing the flanges at the long side edges, there must be provided a space for the stepped portion between the plate pressing opening 9' and the head accessing opening 5 as a result, the plate pressing opening is further relative to the head accessing opening 5. In considering the cleaning effect, it is desired to approach the plate pressing opening 13' to the head accessing opening 5, thereby causing the magnetic head to be contacted with the disc immediately after cleaning thereof. Therefore, it is desired to provide the flanges on the short sides of the pressing plate 13' and the stepped portion is not provided between the head accessing opening 5 and plate pressing opening 9', it is possible to provide the pressing plate 13' adjacent to the head accessing opening 5 to obtain the cleaning effect.

When the magnetic disc 2 is rotated in a high speed in the disc cartridge, the magnetic disc 2 is flattered in the vertical direction. When the magnetic disc 2 is deformed or flattered, contact between the magnetic head and magnetic disc may becomes worse and there may occur tracking error and output fluctuation.

The arcuated ribs 10' are formed to suppress the fluttering of the magnetic disc 2 in the vertical direction and deformation of the magnetic disc and its effect is explained below.

The arcuated ribs 10a and 10b of the top half case 1a and the arcuated ribs 10c and 10d of the bottom half case 1b are so disposed that they are placed adjacent each other in an alternate manner when the top half case 1a and bottom half case 1b are assembled correctly as shown in FIG. 55. The cleaning sheet 16' is so arranged as to cover the arcuated ribs 10a through 10d with slightly projected into the case 1. By projecting the cleaning sheets 16' partially at several positions, interval of the two opposed cleaning sheets at the projected positions is small so that fluttering and deformation of the magnetic disc 2 can be suppressed. Since the cleaning sheets are projected partially, the necessary torque for rotation of the magnetic disc does not increase by the effect of the contact between the cleaning sheet and the magnetic disc.

The arcuated ribs are disposed considering the following points.

In case the cleaning sheets are laid on the entire circle with respect to the magnetic disc, the following problem occurs.

During use of the disc cartridge, the magnetic disc 2 is confined in its vertical movement between the arcuated ribs, between the pressing plates, two opposed magnetic heads and/or magnetic head and pad. There is a difference of the level of the magnetic disc 2 at the position of the arcuated ribs 10a through 10d and the level of the magnetic disc 2 at the position of the pressing plate 13' or the level of the magnetic disc 2 at the position of the arcuated ribs 10a through 10d and the level of the magnetic disc 2 at the position of the magnetic head due to the accuracy of the disc cartridge at the production process.

Assuming that the arcuated ribs extends to the plate pressing opening 9' and the head accessing opening 5, the level difference mentioned above is relatively large, thereby causing the magnetic disc to be deformed on the contrary.

According to the present invention the region where the arcuated ribs 10a to 10d are formed is limited. As the fluttering of the magnetic disc 2 may not occur on the front region of the cartridge case because the magnetic disc 2 is clamped by the pressing plate 13' or the magnetic head, there are provided the arcuated ribs on the backward of the center line X perpendicular to the line passing the head accessing opening 5 in the longitudinal direction from the view point of balance.

As a result of study of the size of extension the arcuated ribs, toward the plate pressing opening 9' and the head accessing opening 5 by the present inventor, it has been found that the arcuated ribs should be formed up to such angle θ of 0° to 40° from the center relative to the line X, preferably 5° to 30°, to suppress the deformation of the magnetic disc 2. In the preferred embodiment shown, all of the arcuated ribs 10a to 10d toward the plate pressing opening 13' extend at an angle 0 in the range from 1° to 15° relative to the line X and the arcuated ribs toward the head accessing opening 5 extend in the range of the angle 0 of from 2° to 30°.

Figure 56:
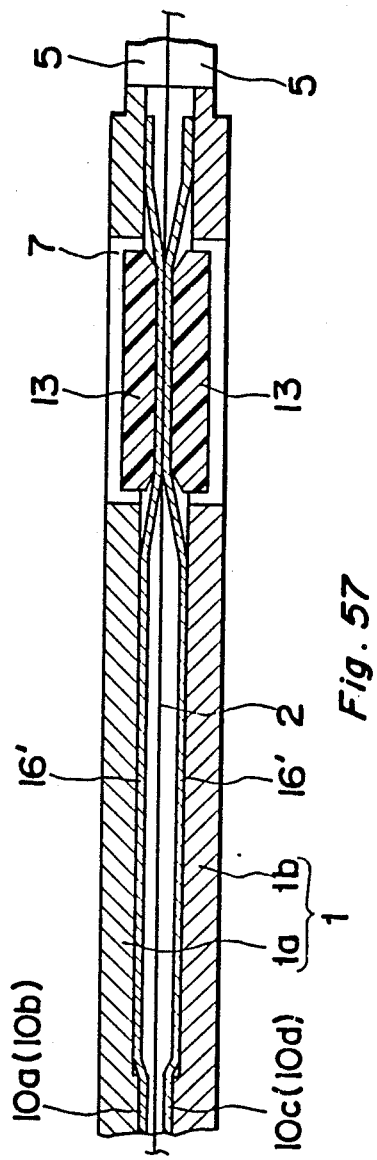
FIG. 56 is a cross sectional view of the disc cartridge and the disc.
Figure 57:
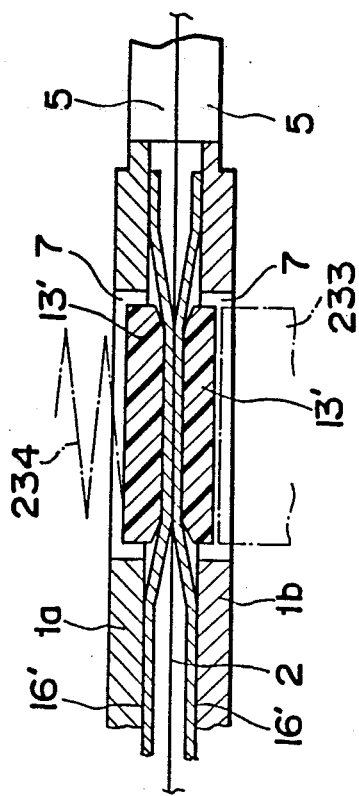
FIG. 57 is a partial cross sectional view showing the condition of the pressing plate when the disc cartridge is mounted in the disc drive.

FIG. 56 shows the arrangement of the ends of the arcuated ribs to the pressing plate 13', wherein none of the arcuated ribs is formed and the magnetic disc 2 is not confined with respect to the vertical movement. Therefore, even if there is a level difference of the magnetic disc 2 at the position of the arcuated ribs 10a to 10d and the magnetic disc 2 at the position of the pressing plate 13', the magnetic disc 2 is slanted gradually in the portion where no ribs are formed, so that the magnetic disc can be prevented from undesired deformation. The same advantage can be obtained in a region between the ends of the arcuated ribs and the magnetic head.

The shutter 3 is made of metal plate such as stainless steel plate or synthetic resin materials such as polyacetal resin or polyamid resin with a predetermined resiliency deformable easier than the cartridge case 1. The shutter 3 is formed by a first flat plate 35', second flat plate 36' opposing in parallel with the first plate 35' and a connecting plate 37' for connecting both plates 35' and 36' so that the shutter 3 is formed generally in a U character shape in a side elevational view and in a trapezoid shape in plan view with a sufficient area for closing the head accessing opening 5.

Two engaging tips 38' which are deformable resiliently are projected on the inside of the shutter facing to the cartridge case 1 with a predetermined interval along the movement of the shutter 3. Each of the engaging tips 38' comprises a column like member 39' projected perpendicular to the connection plate 37' and an engaging piece 40' projected downward.

Figure 58:
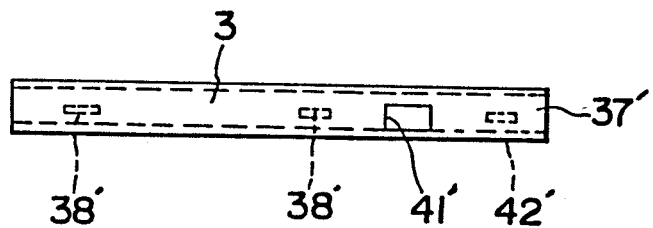
FIG. 58 is a front view of a further embodiment of a shutter.
Figure 59:
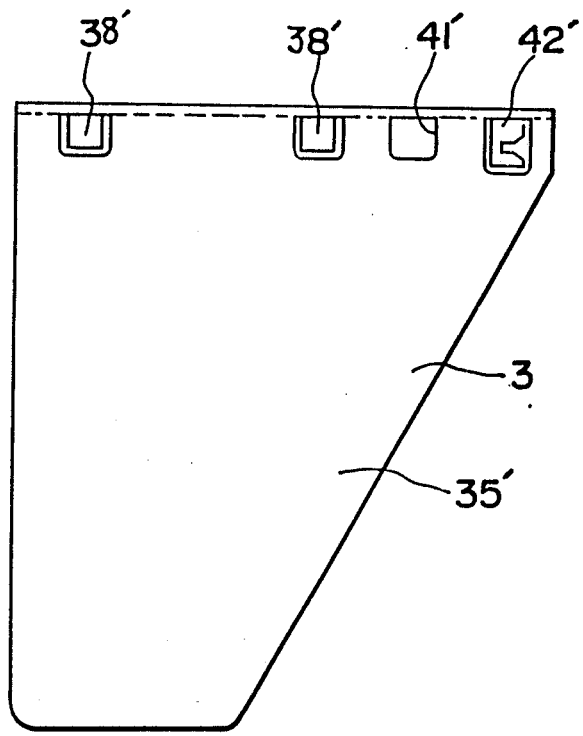
FIG. 59 is a top plan view of FIG. 58.
Figure 60:
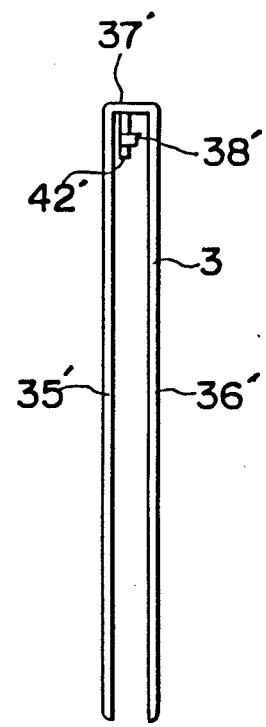
FIG. 60 is a side view of FIG. 58.
Figure 61:
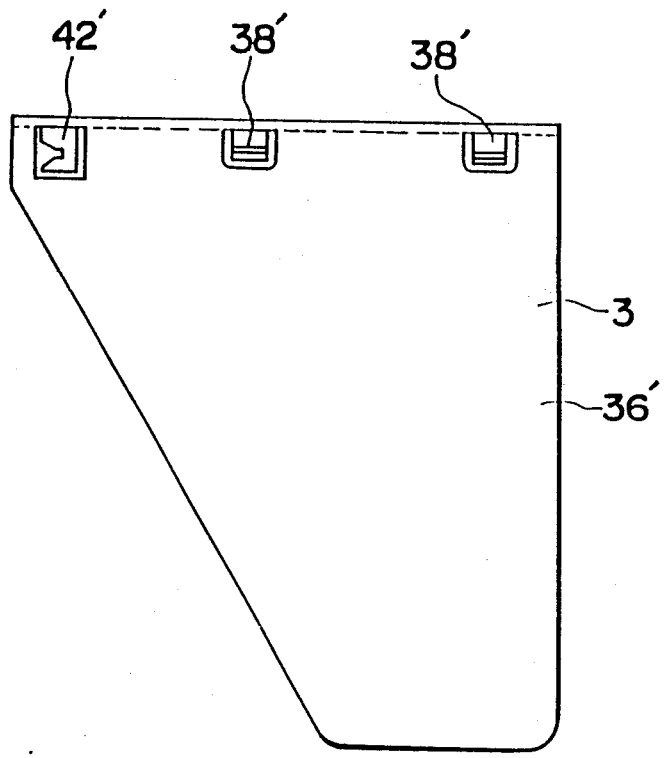
FIG. 61 is a bottom plan view of the shutter of FIG. 58.

As shown in FIGS. 58 and 59, there is defined a cut portion 41' across the corner portions of the first plate 35' and the connecting plate 37'. An opening arm (not shown) of the disc drive can be inserted in the cut portion 41' so as to open the shutter 3 when the disc cartridge is mounted on the disc drive. As shown in FIGS. 59 and 61, a spring stopper 42' is projected in the connecting plate 37' so that a spring 43' is suspended between the stopper 42' and the case 1 so as to resiliently bias the shutter 3 toward the closing position.

As shown in FIGS. 45 and 50, a guide slot 44' and the rib 45' are formed so as to cross the front portion of the head accessing opening 5 in a parallel relation with the slanted surface 46' defined on the front edge of the rib 45'.

Figure 62:
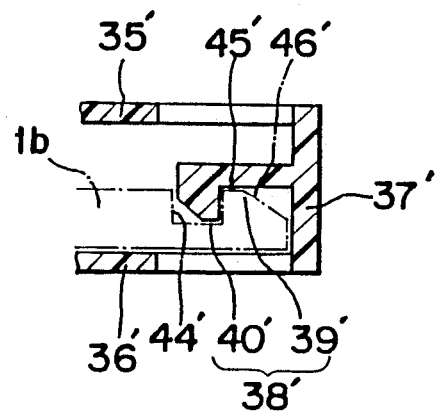
FIG. 62 is a cross sectional view of an essential portion of the shutter of FIG. 58.

When the shutter 3 shown in FIGS. 58 to 62 is mounted to the case 1 pushing the shutter 3 toward the case 1, the end of the engaging tip 38' abuts onto the slanted surface 46' of the bottom half case 1b. Further pushing of the shutter 3 causes the engaging piece 40' to ride over the rib 45', as shown in FIG. 62, by bending the column like member 39' guided by the slanted surface 46', whereby the engaging piece 40' can engage with the guide slot 44' and the shutter 3 can be slidably mounted to the case 1.

In the embodiment described above, although the top half case 1a and bottom half case 1b are connected by the connecting members in the frame portions 20' of both cases in the front region thereof, the present invention is not limited to the connecting arrangement mentioned above, for example both half cases may be connected at the intermediate portion other than the frame portions 20'.

Also, the engagement of the top half case 1a and the bottom half case 1b at the front central portion may be made by bonding using welding or adhering.

One advantage of the embodiment mentioned above is in that the top half case 1a and bottom half case 1b are connected not only at the corners but at the front central portion of the case, therefore undesired expansion of both cases at the portion where the shutter is mounted can be suppressed so that the mounting of the shutter is easy and the shutter can be moved smooth. Therefore, the case body is not unduly scraped due to the smooth movement of the shutter, thereby preventing production of scraped pieces and various problems caused by the scraped pieces can be eliminated.

Another advantage of the present invention is in that the shutter can be easily assembled to the case without expanding the first and second plates, whereby undesired deformation of the shutter can be avoided and the shutter is surely mounted to the case.

A further advantage of the present invention is in that since the engaging members formed on the shutter extend in the direction of the insertion of the shutter to the case and the direction of the extension of the engaging members coincides with the direction of the disengagement of the shutter, when the shutter is forced toward the disengaging direction, the engaging members may be subjected to a force to be expanded. However the engaging members have a sufficient mechanical strength in this direction, such that the shutter can not be easily disengaged from the case.

What is claimed is:

1. A disc cartrige comprising a cartridge case for rotatably accommodating a recording disc and a shutter made entirely of a plastic resin material for opening and closing at least one head accessing opening defined on said cartridge case, wherein said shutter comprises first and second parallel plate members joined by a connecting plate which connects corresponding ends of said first and second parallel plates to form a general U-shaped closure, a first engaging means comprising at least one deformable resilient member consisting of said plastic resin material projected perpendicular from an intermediate portion of said connection plate between and parallel to said first and second parallel plate members, said at least one resilient member having a resilient body portion and a free end portion formed as a tip and a second engaging means formed on said cartridge case having a surface for engagement with said first engaging means, said first engaging means being resiliently bent upon contact of said tip of said free end portion with said surface of said second engaging means when said shutter is assembled on said cartridge case such that said first engaging means is bent upwards to ride up and interlock with said second engaging means thereby mounting said plastic resin shutter on said cartridge case.

2. The disc cartridge according to claim 1, wherein said free end tip portion of said first engaging means is rounded and said second engaging means is an elongated slot defined by a projection rib having an inclined surface which engages said rounded tip portion of said resilient body portion of said first engaging means facilitating insertion of said rounded tip portion into said elongated slot.

3. A disc cartridge comprising a cartridge case for rotatably accommodating a recording disc and a shutter for opening and closing at least one head accessing opening defined on said cartridge case, wherein said shutter comprises first and second parallel plate members joined by a connecting plate which connects corresponding ends of said first and second parallel plates to form a general U-shaped closure, a first engaging means comprising at least one deformable resilient member projected perpendicular from an intermediate portion of said connection plate between and parallel to said first and second parallel plate members, said first and second plate members of said shutter are made of metal plate and said connecting plate and first engaging member is made of a synthetic resin material, said at least one resilient member having a resilient body portion and a free end portion formed as a tip and a second engaging means formed on said cartridge case having a surface for engagement with said first engaging means, said first engaging means being resiliently bent upon contact of said tip of said free end portion with said surface of said second engaging means when said shutter is assembled on said cartridge case such that said first engaging means is bent upwards to ride up and interlock with said second engaging means thereby mounting said shutter on said cartridge case.

4. A disc cartridge comprising a cartridge case formed by a top case half and a bottom case half for rotatably accommodating a recording disc and a shutter for opening and closing at least one head accessing opening defined on said cartridge case, said shutter comprising first and second parallel plate members joined by a connecting plate which connects corresponding ends of said first and second parallel plates to form a general U-shaped closure, a first engaging means comprising a deformable column like resilient engaging member projected perpendicular from an intermediate portion of said connecting plate between and parallel to said first and second parallel plates, said column like member having a free end portion provided with an upper engaging tip projecting upward in a direction toward an inside of said top case half and a lower engaging tip projecting downward in a direction toward an inside of said bottom case half, said cartridge being provided with an engaging opening for receiving said column like engaging member of said shutter, said engaging opening being defined by first and second projecting ribs formed on said top case half and said bottom case half respectively of said cartridge for engaging with said upper and lower engaging tips of said column like engaging member so that said shutter may be slidably mounted on said cartridge case, said first projecting rib of the top case half of the cartridge case having an upwardly inclined face in the direction toward the shutter and said second projecting rib of the bottom case half of the cartridge case having a downward inclined face in the direction toward the shutter, said upper engaging tip having an inclined surface which engages with said upward inclined face of said first projecting rib of said top case half and said lower engaging tip having an inclined surface which engages with said downward inclined face of said second projecting rib of said bottom case half, upon mounting of said shutter on said cartridge case, such that said column engaging member is twisted and guided by said inclined faces of said respective ribs through said engaging opening, thereafter said column engaging member returning to its original state.

5. The disc cartridge according to claim 4, wherein said shutter including said first engaging means consists entirely of a plastic resin material.

* * * * *

UNITED STATES PATENT AND TRADEMARK OFFICE
CERTIFICATE OF CORRECTION

PATENT NO. : 4,918,559

DATED : April 17, 1990

INVENTOR(S) : MARUYAMA et al

It is certified that error appears in the above-identified patent and that said Letters Patent is hereby corrected as shown below:

On title page, item, [73] change "Hitachi Maxwell, Ltd." to

--Hitachi Maxell, Ltd.--

Signed and Sealed this

Sixteenth Day of February, 1993

Attest:

STEPHEN G. KUNIN

Attesting Officer

Acting Commissioner of Patents and Trademarks